(12) United States Patent
Shinohara

(10) Patent No.: US 10,627,628 B2
(45) Date of Patent: Apr. 21, 2020

(54) INFORMATION PROCESSING APPARATUS AND IMAGE GENERATING METHOD

(71) Applicant: SONY INTERACTIVE ENTERTAINMENT INC., Tokyo (JP)

(72) Inventor: Takayuki Shinohara, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 89 days.

(21) Appl. No.: 15/755,615

(22) PCT Filed: Aug. 31, 2016

(86) PCT No.: PCT/JP2016/075552
§ 371 (c)(1),
(2) Date: Feb. 27, 2018

(87) PCT Pub. No.: WO2017/043399
PCT Pub. Date: Mar. 16, 2017

(65) Prior Publication Data
US 2019/0219824 A1    Jul. 18, 2019

(30) Foreign Application Priority Data

Sep. 7, 2015  (JP) ................................. 2015-176034

(51) Int. Cl.
*G02B 27/01* (2006.01)
*G06F 3/0481* (2013.01)
(Continued)

(52) U.S. Cl.
CPC ....... *G02B 27/0172* (2013.01); *G02B 27/017* (2013.01); *G06F 3/01* (2013.01);
(Continued)

(58) Field of Classification Search
CPC .................................................. G02B 27/017
See application file for complete search history.

(56) References Cited

U.S. PATENT DOCUMENTS

2012/0062444 A1* 3/2012 Cok .................. G02B 27/0172
345/8
2013/0257690 A1 10/2013 Fujimaki
(Continued)

FOREIGN PATENT DOCUMENTS

JP    2001-337645    12/2001
JP    2008-033891    2/2008
(Continued)

OTHER PUBLICATIONS

International Search Report and Written Opinion dated Oct. 4, 2016, from the corresponding PCT/JP2016/075552.
(Continued)

*Primary Examiner* — Joseph R Haley
(74) *Attorney, Agent, or Firm* — Katten Muchin Rosenman LLP

(57) ABSTRACT

A motion detecting section 30 detects the attitude of a head-mounted display device worn on the head of a user. An image generating section 34 generates an image in accordance with the detected attitude of the head-mounted display device. An image providing section 36 provides the head-mounted display device with the generated image. When the attitude of the head-mounted display device is changed during display of the image including an information element, the image generating section 34 displays the information element in such a manner that the information element moves along with the image if the amount of change in the attitude is smaller than a predetermined first angle. The image generating section 34 further displays the information element in a position moved by a predetermined second angle in the image if the amount of change in the attitude reaches the predetermined first angle.

7 Claims, 15 Drawing Sheets

(51) Int. Cl.
*G06F 3/01* (2006.01)
*H04N 5/64* (2006.01)
*G09G 5/00* (2006.01)
*G06T 19/00* (2011.01)
*G06F 3/0485* (2013.01)
*G02B 27/02* (2006.01)

(52) U.S. Cl.
CPC .............. *G06F 3/011* (2013.01); *G06F 3/012* (2013.01); *G06F 3/0485* (2013.01); *G06F 3/04815* (2013.01); *G06T 19/00* (2013.01); *G09G 5/00* (2013.01); *H04N 5/64* (2013.01); *G02B 27/02* (2013.01); *G02B 2027/014* (2013.01); *G02B 2027/0138* (2013.01); *G02B 2027/0187* (2013.01)

(56) References Cited

U.S. PATENT DOCUMENTS

| | | | |
|---|---|---|---|
| 2014/0139624 A1 | 5/2014 | Shinozaki et al. | |
| 2015/0170422 A1* | 6/2015 | Aoyama | G06T 19/006 345/8 |

FOREIGN PATENT DOCUMENTS

| | | |
|---|---|---|
| JP | 2009-60278 A | 3/2009 |
| JP | 2011-197736 | 10/2011 |
| JP | 2013-030874 | 2/2013 |
| JP | 2013-30874 A | 2/2013 |
| JP | 2015-090635 | 5/2015 |
| JP | 2015-95045 A | 5/2015 |
| JP | 2017-004357 | 1/2017 |
| WO | 2010/089989 A1 | 8/2010 |

OTHER PUBLICATIONS

International Preliminary Report on Patentability dated Mar. 13, 2018, from the corresponding PCT/JP2016/075552.
uniulmMI: "Streiflicht2015 WideAR", Youtube, May 13, 2015 (May 13, 2015), p. 2 pp., XP054979183, Retrieved from the Internet: URL:https://www.youtube.com/watch?v=9g7pwL90HPA [retrieved on Mar. 1, 2019] *see 4:07-4:30, 5:19, 5:27, and 6:20*, 2 sheets.
The extended European search report dated Mar. 13, 2019, from European Application No. 16844260.6, 11 sheets.
Notification of Reasons for Refusal dated Aug. 7, 2018, from the corresponding Japanese Patent Application No. 2015-176034.

* cited by examiner (a)

(b)

(a)

(b)

(a)

(b)

(a)

(b)

//  INFORMATION PROCESSING APPARATUS AND IMAGE GENERATING METHOD

TECHNICAL FIELD

The present invention relates to technology for generating an image to be displayed on a head-mounted display device.

BACKGROUND ART

A head-mounted display device (HMD) worn on the head of a user provides the user with a virtual reality (VR) world. Recently, applications have been introduced which allow the user to play games while watching the screen displayed on the HMD. Existing non-portable display devices such as TV sets let the user's visual field range stray outside the screen. This may prevent the user from concentrating on the screen or having the sense of immersion in the ongoing game. In contrast, wearing the HMD allows the user to watch only images displayed on the HMD. This enhances the sense of immersion in the game and also boosts the sense of entertainment for the user. When the HMD is provided with a head tracking function that updates the display screen in keeping with the attitude of the user's head, the sense of immersion in the visual word is further enhanced.

Recent years have witnessed widespread use of an omnidirectional camera (omniazimuth camera) for capturing an omnidirectional, 360-degree panoramic image. Also, development has been underway of remotely controllable unmanned flying objects. Mounting multiple cameras on such a flying object makes it possible to capture an omnidirectional panoramic image from the air. If the HMD is caused to display the omnidirectional panoramic image captured in this manner and to let the head tracking function update the display screen in keeping with the attitude of the user's head, the user is expected to feel as if he or she is in the real world.

CITATION LIST

Patent Literature

[PTL 1]
JP 2015-95045A

SUMMARY

Technical Problem

In a recent trend of improving the realistic sensation of imagery, development is actively underway of techniques for widening the viewing angle of the HMD. HMDs with their viewing angle exceeding 80 degrees have already been commercialized. The wide-viewing-angle HMD offers the user the world of video imagery comparable to the real world.

The inventors experimented with various kinds of image display on the wide-viewing-angle HMD. The experiments revealed the possibility that the user may feel sick depending on how the image is presented. This sensation will be referred to as "motion sickness" or "simulator sickness" hereunder in this description. In some experiments, the same image did not provoke motion sickness when being viewed on the TV screen but triggered the unpleasant sensation while being watched on a HMD screen. Where information elements such as a menu were included in the display image, the user had a feeling of discomfort depending on how the information elements were presented. The findings from such diverse experiments have led the inventors to devise a manner of display control suitable for the HMD.

The present invention has been made in view of the above circumstances. An object of the invention is therefore to provide technology for implementing display control suitable for the HMD.

Solution to Problem

In solving the above problem and according to one aspect of the present invention, there is provided an information processing apparatus including: a detecting section configured to detect the attitude of a head-mounted display device worn on the head of a user; an image generating section configured to generate an image in accordance with the attitude of the head-mounted display device detected by the detecting section; and an image providing section configured to provide the head-mounted display device with the generated image. The image generating section includes an information element into the generated image. When the attitude of the head-mounted display device is changed during display of the image including the information element on the head-mounted display device, the image generating section displays the information element in such a manner that the information element moves along with the image if the amount of change in the attitude is smaller than a predetermined first angle. The image generating section further displays the information element in a position moved by a predetermined second angle in the image if the amount of change in the attitude reaches the predetermined first angle.

According to another aspect of the present invention, there is provided an image generating method including the steps of: detecting the attitude of a head-mounted display device worn on the head of a user; and generating an image in accordance with the detected attitude of the head-mounted display device. The image generating step includes an information element into the generated image. When the attitude of the head-mounted display device is changed during display of the image including the information element on the head-mounted display device, the image generating step displays the information element in such a manner that the information element moves along with the image if the amount of change in the attitude is smaller than a predetermined first angle. The image generating step further displays the information element in a position moved by a predetermined second angle in the image if the amount of change in the attitude reaches the predetermined first angle.

Incidentally, if other combinations of the above-outlined composing elements or the above expressions of the present invention are converted between different forms such as a method, a device, a system, a computer program, and a recording medium having the computer program recorded readably thereon, they still constitute effective embodiments of this invention.

DESCRIPTION OF EMBODIMENT

Figure 1:
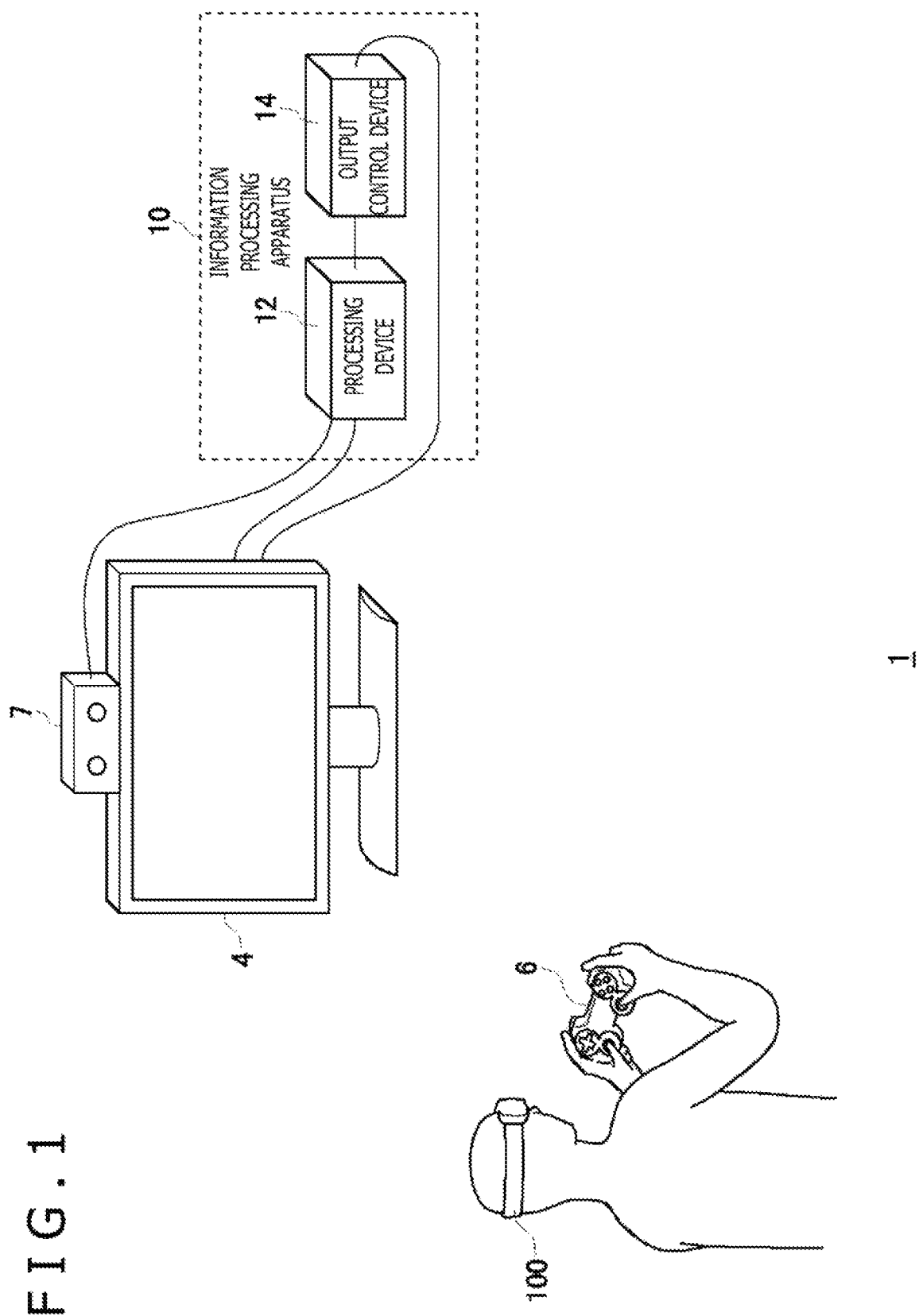
FIG. 1 is a schematic diagram illustrating a typical configuration of an information processing system as one embodiment of the present invention.

FIG. 1 illustrates a typical configuration of an information processing system 1 as one embodiment of the present invention. The information processing system 1 includes an information processing apparatus 10, a head-mounted display device (HMD) 100 worn on the head of the user, an input device 6 operated by the user with fingertips, an imaging device 7 for imaging the user wearing the HMD 100, and an output device 4 for displaying images.

In this embodiment, the information processing apparatus 10 includes a processing device 12 and an output control device 14. The processing device 12 is a terminal device that executes diverse applications including games in response to operation information coming from the input device 6 operated by the user. The processing device 12 and the input device 6 may be connected with each other by cable or by known wireless communication technology. The output control device 14 is a processing unit that outputs image data to the HMD 100. The output control device 14 and the HMD 100 may be connected with each other by cable or by known wireless communication technology.

The imaging device 7 captures an image of the user wearing the HMD 100 and feeds the captured image to the processing device 12. The imaging device 7 may be a stereo camera. As will be discussed later, the HMD 100 is furnished with markers (light-emitting diodes (LEDs) for tracking) permitting tracking of the user's head. In accordance with the captured marker positions, the processing device 12 detects the movement of the HMD 100. The HMD 100 is further provided with attitude sensors (an acceleration sensor and a gyro sensor). The processing device 12 acquires from the HMD 100 sensor information detected by the attitude sensors, implementing a highly precise tracking process with the joint use of the sensor information and captured marker images.

Installation of the output device 4 is not mandatory for the information processing system 1 because the user views images displayed on the HMD 100. Still, the output control device 14 or the processing device 12 may cause the output device 4 to output the same image as that displayed on the HMD 100. This allows another user to view on the output device 4 the image being watched by the user on the HMD 100. As will be described later, the image displayed on the HMD 100 is corrected for the distortion of optical lenses. This requires getting the output device 4 to output an image not corrected for the distortion.

In the information processing system 1, the processing device 12, output device 4, input device 6, and imaging device 7 may constitute a conventional game system. In this case, the processing device 12 may be a game device that executes applications such as video games, and the input device 6 may be a game controller, a keyboard, a mouse, a joystick, or some other suitable device for supplying the processing device 12 with the operation information from the user. Supplementing this game system with the output control device 14 and the HMD 100 as additional components makes up the information processing system 1 that executes virtual reality (VR) applications.

The function of the output control device 14 may be incorporated in the processing device 12 as part of the functions of VR applications. That is, the information processing apparatus 10 may be formed by the processing device 12 alone or by the processing device 12 and the output control device 14. In the description that follows, the function of the processing device 12 and that of the output control device 14 necessary for implementing VR applications will be explained collectively as functions of the information processing apparatus 10.

The information processing apparatus 10 generates image data to be displayed on the HMD 100. In this embodiment, the information processing apparatus 10 prepares an omnidirectional, 360-degree panoramic image captured by an omnidirectional camera, and causes the HMD 100 to display an image generated on the basis of a visual line direction determined by the attitude of the HMD 100 worn on the user's head. The content of display may be a still image or a moving image. The display content is not limited to actually captured images; the content may also be images rendered in real time by a game application.

The HMD 100 is a display device that is worn on the user's head and displays images through optical lenses on a display panel positioned in front of the user's eyes. The HMD 100 displays a left-eye image on the left half of the display panel and a right-eye image on the right half of the display panel in a manner independent of each other. These images constitute parallax images viewed from the right and left viewpoints. When displayed on the right-half and left-half portions of the display panel, the parallax images make up a stereoscopic image. Because the user views the display panel through optical lenses, the information processing apparatus 10 supplies the HMD 100 with the image data corrected beforehand for the optical distortion of the lenses. In the information processing apparatus 10, the optical distortion correcting process may be performed by the processing device 12 or by the output control device 14.

Figure 2:
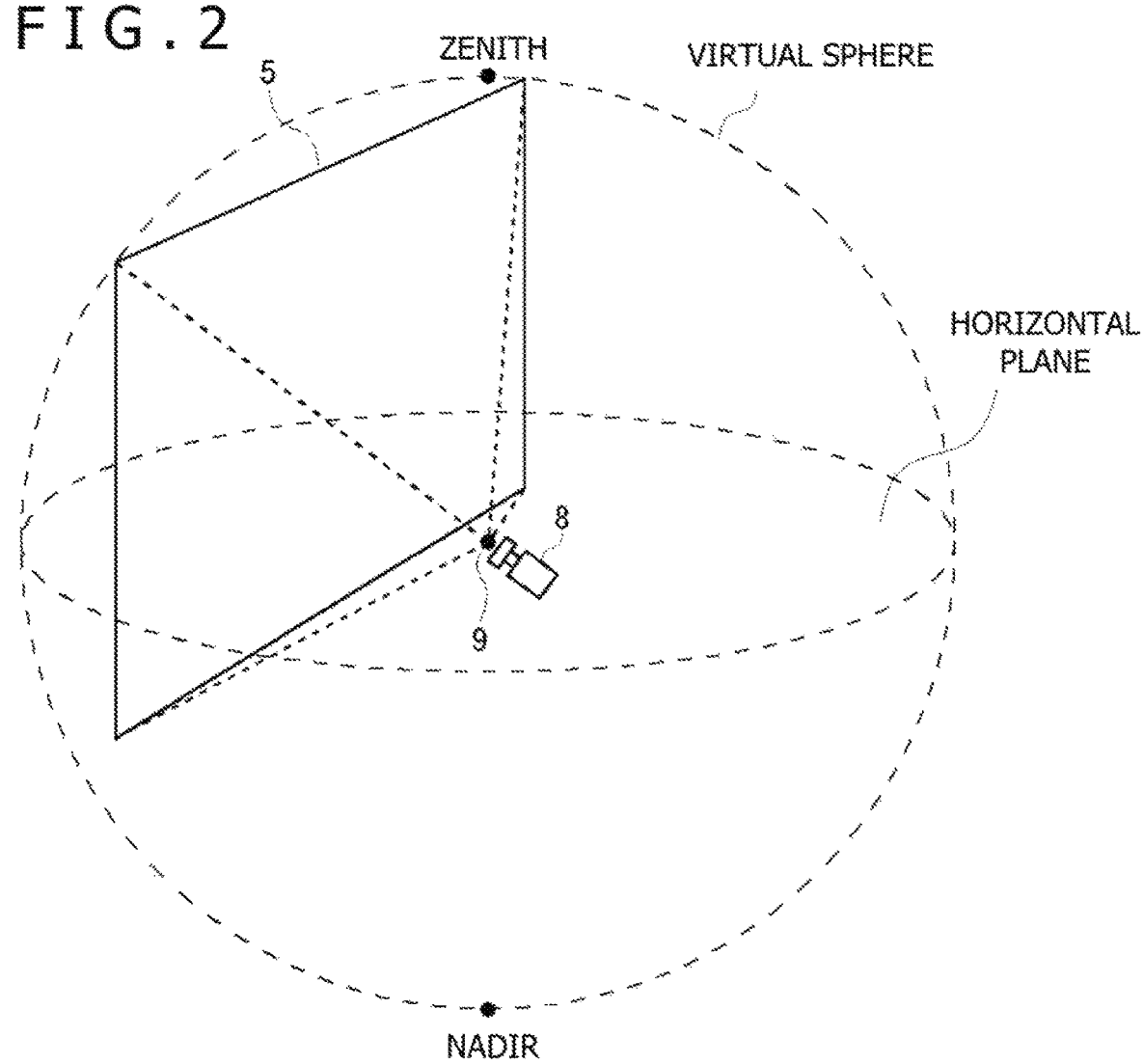
FIG. 2 is an explanatory diagram explaining a rendering process performed by an information processing apparatus.

FIG. 2 is an explanatory diagram explaining a rendering process performed by the information processing apparatus 10. For VR application of this embodiment, a virtual environment is provided in such a manner that the user feels as if he or she is at the center of a sphere and that the image visible to the user is varied when his or her visual line direction is changed. A content image constituting the image material is pasted on the inner circumferential surface of a virtual sphere centering on a center point 9 at which the user is positioned. The content image is an omnidirectional, 360-degree panoramic image captured by an omnidirectional camera. This content image is pasted on the inner circumferential surface of the virtual sphere in such a manner that the zenith and nadir positions of the image coincide with those of the virtual sphere. When the zenith and nadir positions of the user's real world are thus aligned with those of the visual world offered to the HMD 100, it permits implementation of a VR application that reproduces the realistic visual world.

The information processing apparatus 10 detects the rotation angle and inclination of the user's head (HMD 100 in reality) by performing a tracking process on the user's head position. The rotation angle of the HMD 100 is defined relative to a horizontal reference direction. For example, the direction in which the HMD 100 is oriented when switched on may be established as the reference direction. The inclination of the HMD 100 is defined as an inclination angle relative to a horizontal plane. Existing techniques may be used to implement the head tracking process. The information processing apparatus 10 may detect the rotation angle and inclination of the HMD 100 solely from the sensor information detected by the attitude sensors of the HMD 100. The information processing apparatus 10 may also detect the rotation angle and inclination of the HMD 100 with higher accuracy by analyzing images of the markers (tracking LEDs) on the HMD 100 captured by the imaging device 7.

The information processing apparatus 10 determines the attitude of a virtual camera 8 in the virtual sphere in accordance with the detected rotation angle and inclination of the HMD 100. The virtual camera 8 is arranged to image the inner circumferential surface of the virtual sphere from its center point 9. The information processing apparatus 10 aligns the detected rotation angle and inclination with the rotation angle and inclination of the optical axis of the virtual camera 8 in the virtual sphere. The information processing apparatus 10 acquires a captured image 5 from the virtual camera 8, i.e., performs a rendering process, corrects the image for the optical distortion of the optical lenses, and feeds the image data to the HMD 100. Whereas FIG. 2 illustrates a single virtual camera 8, a right-eye virtual camera 8 and a left-eye virtual camera 8 are in reality provided to generate their respective image data.

Figure 3:
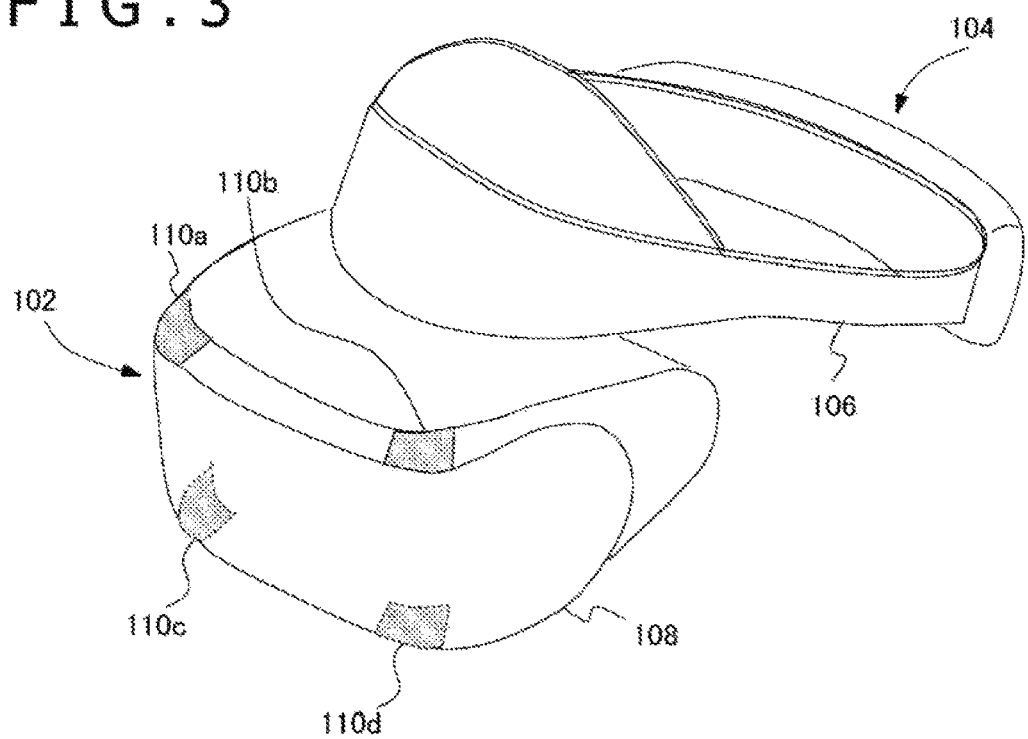
FIG. 3 is a schematic diagram illustrating a typical external shape of the HMD.

FIG. 3 illustrates a typical external shape of the HMD 100. In this example, the HMD 100 is made up of an output mechanism section 102 and a wearing mechanism section 104. The wearing mechanism section 104 includes a wearing band 106 worn by the user to fasten the HMD 100 around the head. The wearing band 106 uses a material or a structure that allows the band to be adjusted in length to fit around the user's head.

The output mechanism section 102 includes an enclosure 108 that covers both eyes of the user wearing the HMD 100. Inside the enclosure 108 is a display panel positioned straight against the eyes when the HMD 100 is worn. The display panel may be formed by a liquid crystal panel or by an organic electroluminescent (EL) panel, for example. Also inside the enclose 108 are a pair of right and left optical lenses positioned between the display panel and the user's eyes when the HMD 100 is worn, the optical lenses serving to widen the viewing angle of the user. The HMD 100 may be further equipped with speakers or earphones positioned against the user's ears when the HMD 100 is worn.

The external surface of the enclosure 108 is equipped with light-emitting markers 110a, 110b, 110c and 110d. Although tracking LEDs make up the light-emitting markers 110 in this example, other suitable markers may be used instead. In any case, the markers need only be imaged by the imaging device 7 in a manner permitting image analysis by the information processing apparatus 10. Whereas the light-emitting markers 110 are not limited in number and in arrangement, their number and their arrangement need to be such as to permit detection of the attitude of the HMD 100 (its rotation angle and inclination). In the illustration, the markers are arranged at four corners on the front of the enclosure 108. The light-emitting markers 110 may be additionally arranged on the sides and the rear of the wearing band 106. These additional markers may be imaged if the user turns his or her back to the imaging device 7.

The HMD 100 may be connected with the information processing apparatus 10 by cable or by known wireless communication technology. The HMD 100 transmits sensor information detected by the attitude sensors to the information processing apparatus 10. The HMD 100 also receives image data generated by the information processing apparatus 10 and displays the received data on the display panel.

Whereas the HMD 100 illustrated in FIG. 3 is an immersive (non-transmissive) display device that fully covers both eyes, the HMD 100 may also be a transmissive display device. In terms of shape, the HMD 100 may be of hat type as illustrated but may also be of spectacle type.

Figure 4:
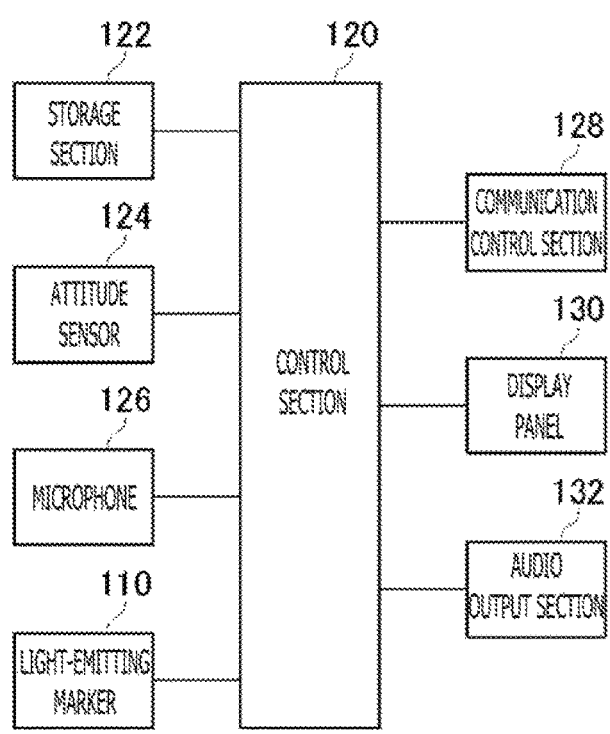
FIG. 4 is a block diagram illustrating functional blocks of the HMD.

FIG. 4 illustrates functional blocks of the HMD 100. A control section 120 is a main processor which processes diverse data such as image data, audio data, sensor information, and instructions and which outputs what is processed. A storage section 122 temporarily stores the data and instructions processed by the control section 120. Attitude sensors 124 detect attitude information about the HMD 100 such as its rotation angle and inclination. The attitude sensors 124 include at least a three-axis acceleration sensor and a three-axis gyro sensor. A microphone 126 converts the user's voice to an electrical signal. The light-emitting markers 110 are multiple LEDs attached to the wearing band 106 and enclosure 108 of the HMD 100.

A communication control section 128 transmits the data input from the control section 120 to an external information processing apparatus 10 by wired or wireless communication via a network adapter or an antenna. The communication control section 128 further receives data from the information processing apparatus 10 by wired or wireless communication via the network adapter or the antenna, and outputs the received data to the control section 120.

Upon receipt of image data and audio data from the information processing apparatus 10, the control section 120 feeds the received data to the display panel 130 for display and to an audio output section 132 for audio output. The control section 120 further causes the communication control section 128 to transmit the sensor information from the attitude sensors 124 and the audio data form the microphone 126 to the information processing apparatus 10.

Figure 5:
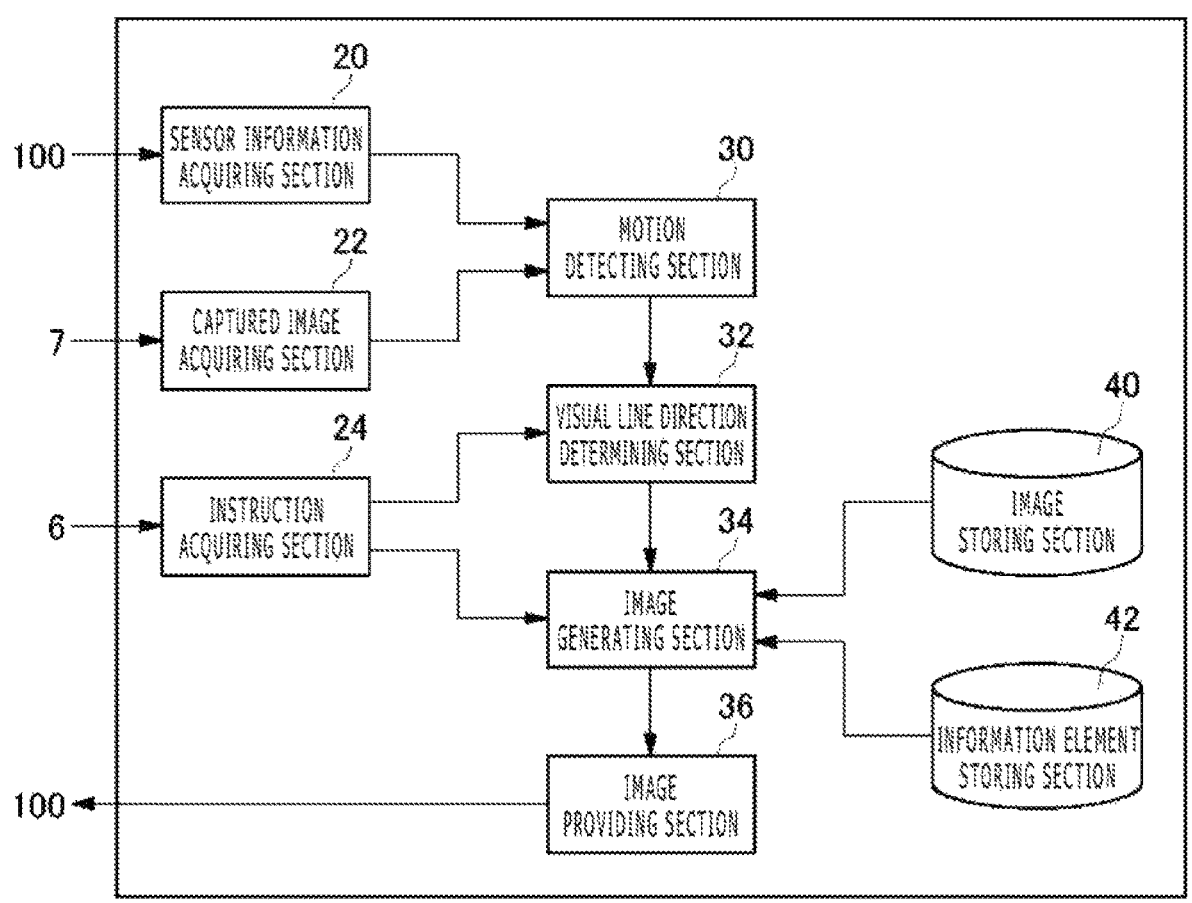
FIG. 5 is a block diagram illustrating functional blocks of the information processing apparatus.

FIG. 5 illustrates functional blocks of the information processing apparatus 10. The information processing apparatus 10 includes a sensor information acquiring section 20, a captured image acquiring section 22, and an instruction acquiring section 24, the sections serving as an input interface to the outside. The sensor information acquiring section 20 acquires the sensor information at predetermined intervals from the attitude sensors 124 of the HMD 100. The captured image acquiring section 22 acquires captured images from the imaging device 7 imaging the HMD 100 at predetermined intervals. For example, the imaging device 7 captures images at intervals of 1/60 second, while the captured image acquiring section 22 acquires captured images at intervals of 1/60 second. The instruction acquiring section 24 acquires instructions input by the user from the input device 6.

The information processing apparatus 10 further includes a motion detecting section 30, a visual line direction determining section 32, an image generating section 34, and an image providing section 36. The motion detecting section 30 detects the attitude of the HMD 100 worn on the user's head. The visual line direction determining section 32 determines the visual line direction in accordance with the attitude of the HMD 100 detected by the motion detecting section 30. The image generating section 34 generates images in accordance with the detected attitude of the HMD 100. Specifically, the image generating section 34 generates images based on the visual line direction determined by the visual line direction determining section 32. The image providing section 36 provides the generated image to the HMD 100.

The components indicated in FIG. 5 as functional blocks for carrying out diverse processes may each be configured by a circuit block, a memory, or some other large-scale integrated (LSI) circuit in terms of hardware, or by a program loaded into a memory in terms of software. Thus it will be understood by those skilled in the art that these functional blocks are realized by hardware alone, by software alone, or by a combination of both in diverse forms and are not limited to any of such forms.

An image storing section 40 stores 360-degree panoramic image data captured beforehand. The image storing section 40 may store multiple content images. The content images may be still images or moving images. The image storing section 40 in the embodiment stores omnidirectional panoramic image data. The information processing apparatus 10 provides the user wearing the HMD 100 with an omnidirectional panoramic image. When the user turns his or her head to the right or to the left (the user may turn his or her entire body right or left) to turn his or her horizontal visual line right or left, the display panel 130 of the HMD 100 displays a panoramic image in the right or left direction. When the user tilts his or her head upward or downward to incline the visual line vertically, the display panel 130 of the HMD 100 displays a panoramic image in the upward or downward direction.

An information element storing section 42 stores information elements to be included in panoramic images. For example, the information elements may be menu items for changing the luminance of content images or for selecting a content image as an image material. When the user inputs to the input device 6 an instruction to display information elements, the image generating section 34 includes the information elements into the image to be generated. The information elements superimposed on the panoramic image are then displayed on the display panel 130 of the HMD 100. The information elements may also be notification information destined for the user. In this case, the information elements may be superimposed on the panoramic image without being invoked by the user operating the input device 6.

Figure 6:
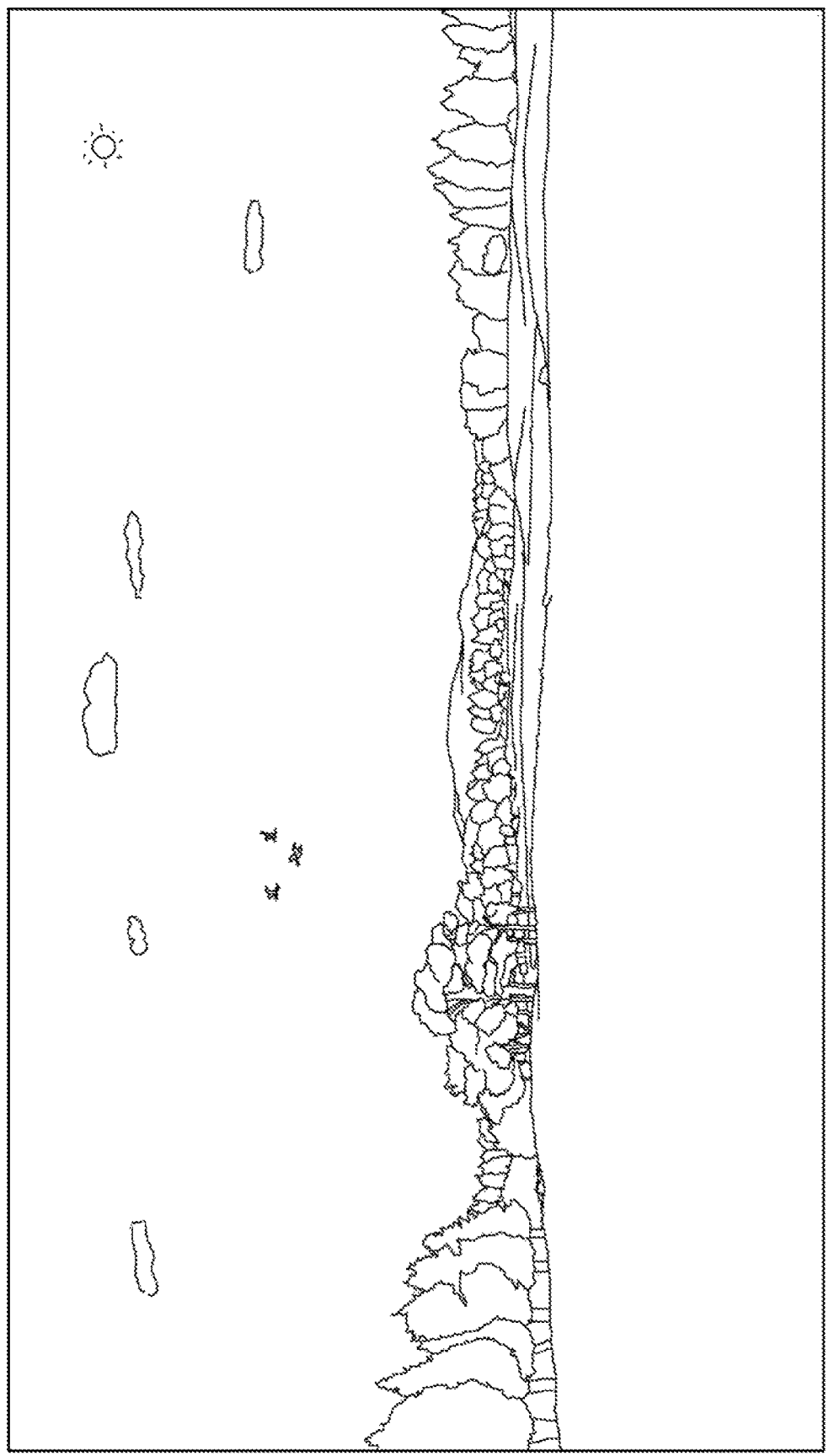
FIG. 6 is an explanatory diagram explaining panoramic image data to be stored in an image storing section.

FIG. 6 is an explanatory diagram explaining panoramic image data to be stored in the image storing section 40. For purpose of explanation, FIG. 6 illustrates part of an omnidirectional panoramic image, and omits portions of the image from the horizontal plane downward as well as portions of the image in the right and left directions. As discussed above with reference to FIG. 2, the display panel 130 of the HMD 100 displays an image formed by rendering the panoramic image pasted on the inner circumferential surface of the virtual sphere. When the user changes his or her visual line direction by moving the rotation angle and inclination of the HMD 100, the panoramic image being displayed is moved in keeping with the visual line direction.

The communication control section 128 of the HMD 100 transmits to the information processing apparatus 10 the sensor information acquired at predetermined intervals by the attitude sensors 124. The imaging device 7 images the HMD 100 at predetermined intervals and transmits the captured images to the information processing apparatus 10. Referring to FIG. 5, the sensor information acquiring section 20 acquires the sensor information from the attitude sensors 124 and feeds the acquired information to the motion detecting section 30. The captured image acquiring section 22 acquires a captured image and feeds it to the motion detecting section 30.

In detecting the attitude of the HMD 100, the motion detecting section 30 performs the head tracking process to detect the attitude of the user's head wearing the HMD 100. The head tracking process is carried out to synchronize the field of view displayed on the display panel 130 of the HMD 100 with the attitude of the user's head. The head tracking process of the embodiment involves detecting the rotation angle of the HMD 100 relative to a horizontal reference direction and the inclination angle of the HMD 100 relative to a horizontal plane. The horizontal reference direction may be established as the direction in which the HMD 100 is oriented when switched on, for example.

The head tracking process may be performed using existing techniques, with the motion detecting section 30 detecting the rotation angle of the HMD 100 relative to the horizontal reference direction and the inclination angle of the HMD 100 relative to the horizontal plane solely from the sensor information given by the attitude sensors 124. Preferably, the accuracy of the detection may be enhanced by the additional use of captured images of the light-emitting markers 110 for tracking purposes. The motion detecting section 30 detects the rotation angle and the inclination angle at predetermined intervals. For example, if the image fed to the HMD 100 is captured at 60 frames per second (fps), the motion detecting section 30 may preferably perform its detecting process at intervals of 1/60 second.

The visual line direction determining section 32 determines the visual line direction in accordance with the attitude of the HMD 100 detected by the motion detecting section 30. The visual line direction thus determined is both the visual line direction of the user and that (optical axis direction) of the virtual camera 8 arranged at the center point 9 of the virtual sphere (see FIG. 2). Here, the visual line direction determining section 32 may determine the rotation angle and inclination angle detected by the motion detecting section 30 directly as representative of the visual line direction (optical axis direction) of the virtual camera 8. The visual line direction determining section 32 may also determine the visual line direction of the virtual camera 8 by carrying out some suitable correcting process. If the motion detecting section 30 is not supplied with stable sensor information, as when the sensor information is contaminated with noise, the motion detecting section 30 might detect vibrating movements despite the user's head being stationary. In such a case, the visual line direction determining section 32 may determine the visual line direction by smoothing out the movements detected by the motion detecting section 30.

Incidentally, the field of view of the humans is vertically asymmetrical; the view under the visual line is slightly wider than the view thereabove. Thus the visual line direction determining section 32 may determine the visual line direction of the virtual camera 8 by slightly tilting down the inclination angle detected by the motion detecting section 30.

The image generating section 34 generates an image in accordance with the attitude of the HMD 100 detected by the motion detecting section 30. Specifically, the image generating section 34 generates an image based on the visual line direction of the virtual camera 8 determined by the visual line direction determining section 32. The image generating section 34 determines the right-eye and left-eye visual fields defined by the visual line direction, before generating a right-eye image and a left-eye image through rendering. At this point, the image generating section 34 generates a panoramic image corrected for the distortion of the image light coming from the display panel and passing through the optical lenses.

The HMD 100 of the embodiment provides the user with the visual field at an angle of approximately 100 degrees to the horizontal direction and at an angle of approximately 100 degrees to the vertical direction. Referring to FIG. 2, the captured image 5 is obtained at an angle of view of approximately 100 degrees to the horizontal direction and at an angle of view of approximately 100 degrees to the vertical direction inside the virtual sphere. The captured image 5 is displayed on the display panel 130 of the HMD 100. As mentioned above, the visual field of the humans is slightly wider under the visual line than thereabove. For this reason, the optical lenses and the display panel 130 of the HMD 100 may be tilted 5 degrees in a direction opposite to the eye position. The optical lenses and the display panel 130 may thus be arranged to implement a vertical field of view at an upward angle of 45 degrees and at a downward angle of 55 degrees.

Figure 7:
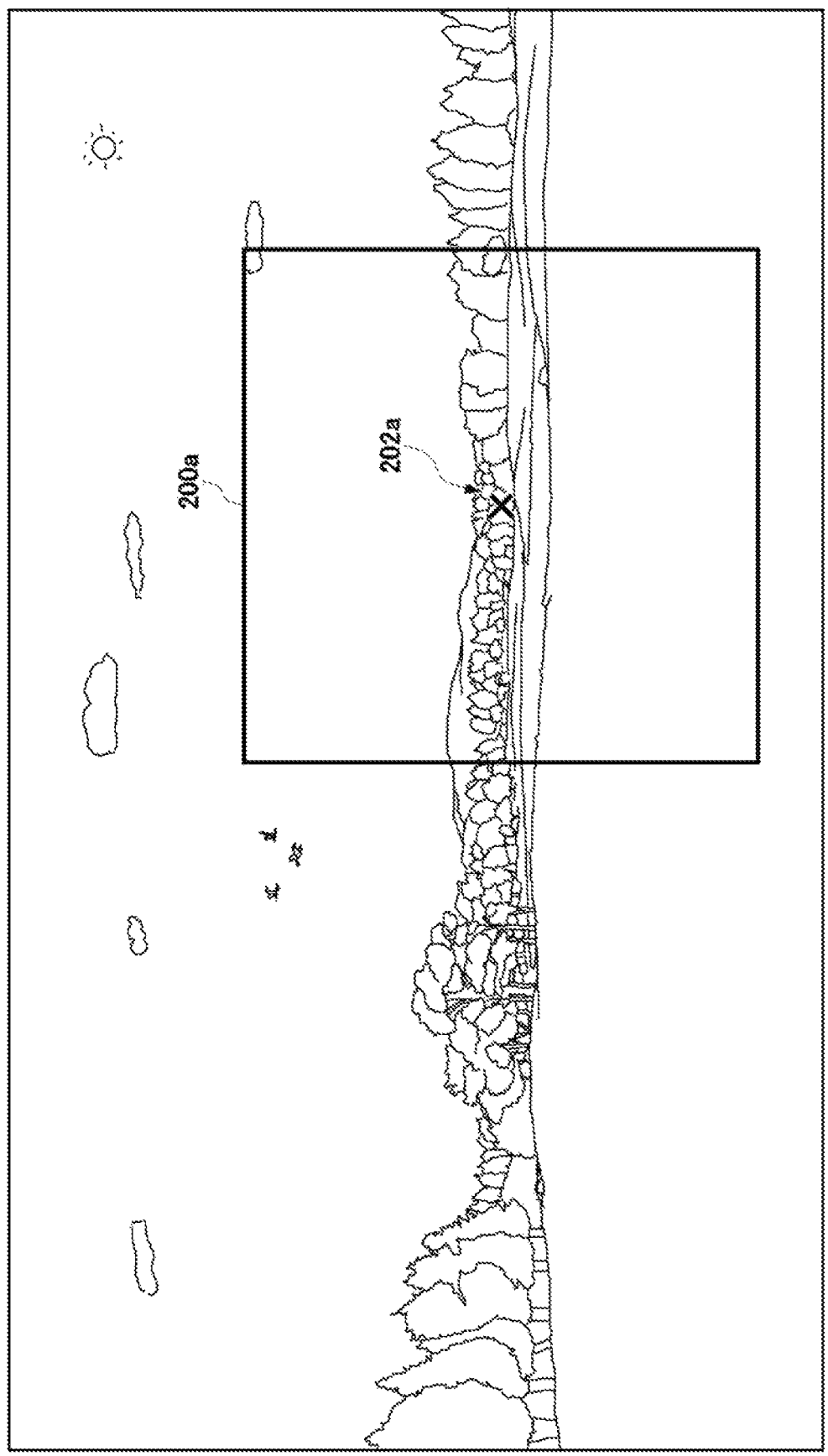
FIG. 7 is a schematic diagram illustrating a display image.

FIG. 7 illustrates a display image 200a generated by the image generating section 34. In the drawings referenced below, the display image will be presented as an image cut out of the panoramic image for the ease of understanding the positional relation of the display image within the entire panoramic image.

The image generating section 34 generates an image based on a visual line direction 202a determined by the visual line direction determining section 32. In practice, the image generating section 34 generates a right-eye display image and a left-eye display image separately through rendering as different images each containing a parallax. In the description that follows, however, no mention will be made of the images being generated separately for both eyes. The image providing section 36 provides the HMD 100 with the display image 200a generated by the image generating section 34. The control section 120 in the HMD 100 causes the display panel 130 to display the display image 200a. The user is then able to view the display image 200a displayed on the display panel 130.

Figure 8:
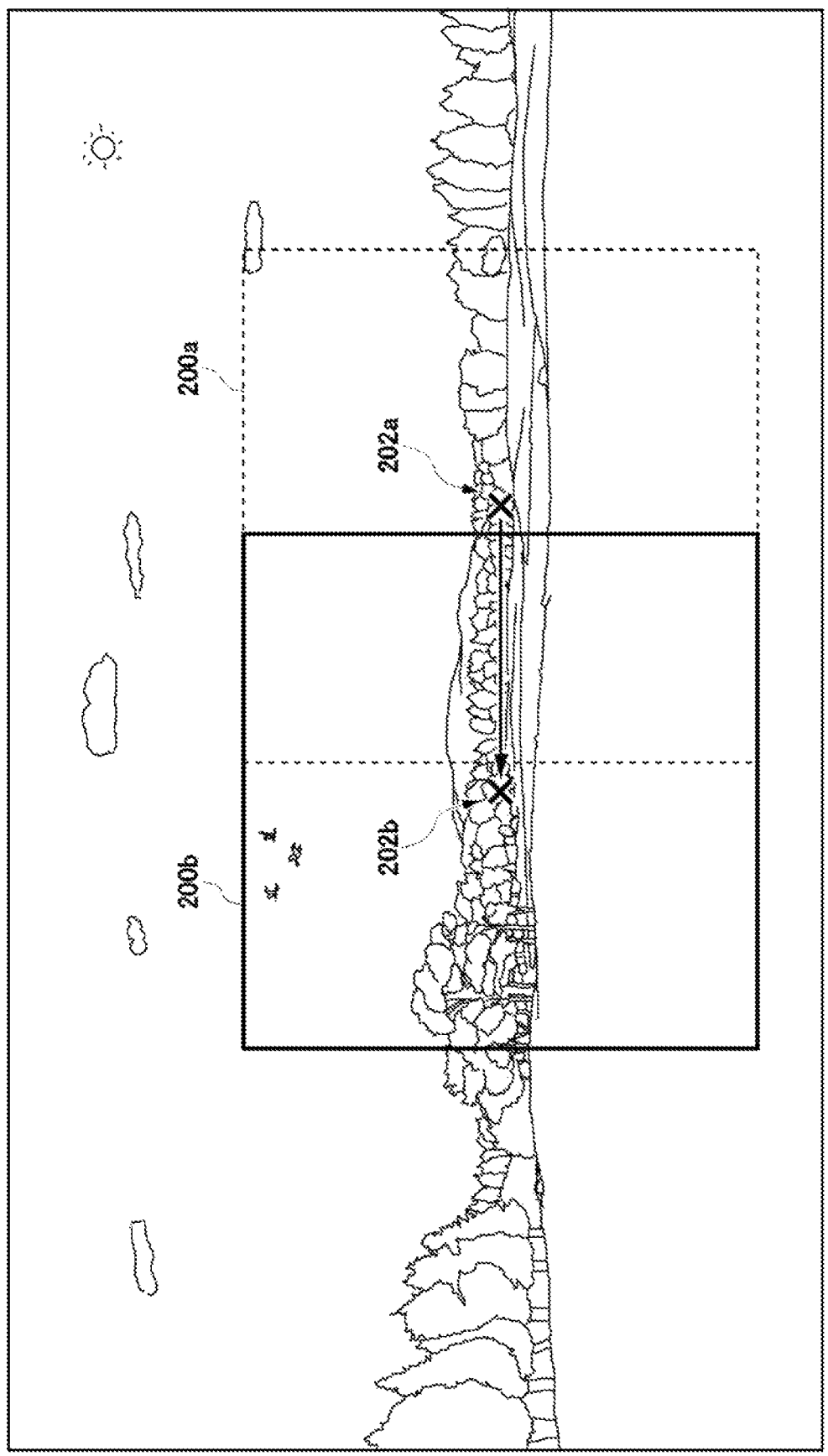
FIG. 8 is a schematic diagram illustrating another display image.

FIG. 8 illustrates a display image 200b generated by the image generating section 34. The visual line direction determining section 32 determines the visual line direction in accordance with the attitude of the HMD 100. The image generating section 34 generates the image based on the visual line direction thus determined. This example indicates that the user has turned his or her head to the left, with the visual line changed continuously from a visual line direction 202a to a visual line direction 202b. Here, the user has turned his or her head approximately 60 degrees to the left. The turning motion causes the image generating section 34 to generate images at intervals of 1/60 second in a manner turning the panoramic image continuously to the left starting from the display image 200a. The image providing section 36 provides the HMD 100 with the generated images at intervals of 1/60 second.

Figure 9:
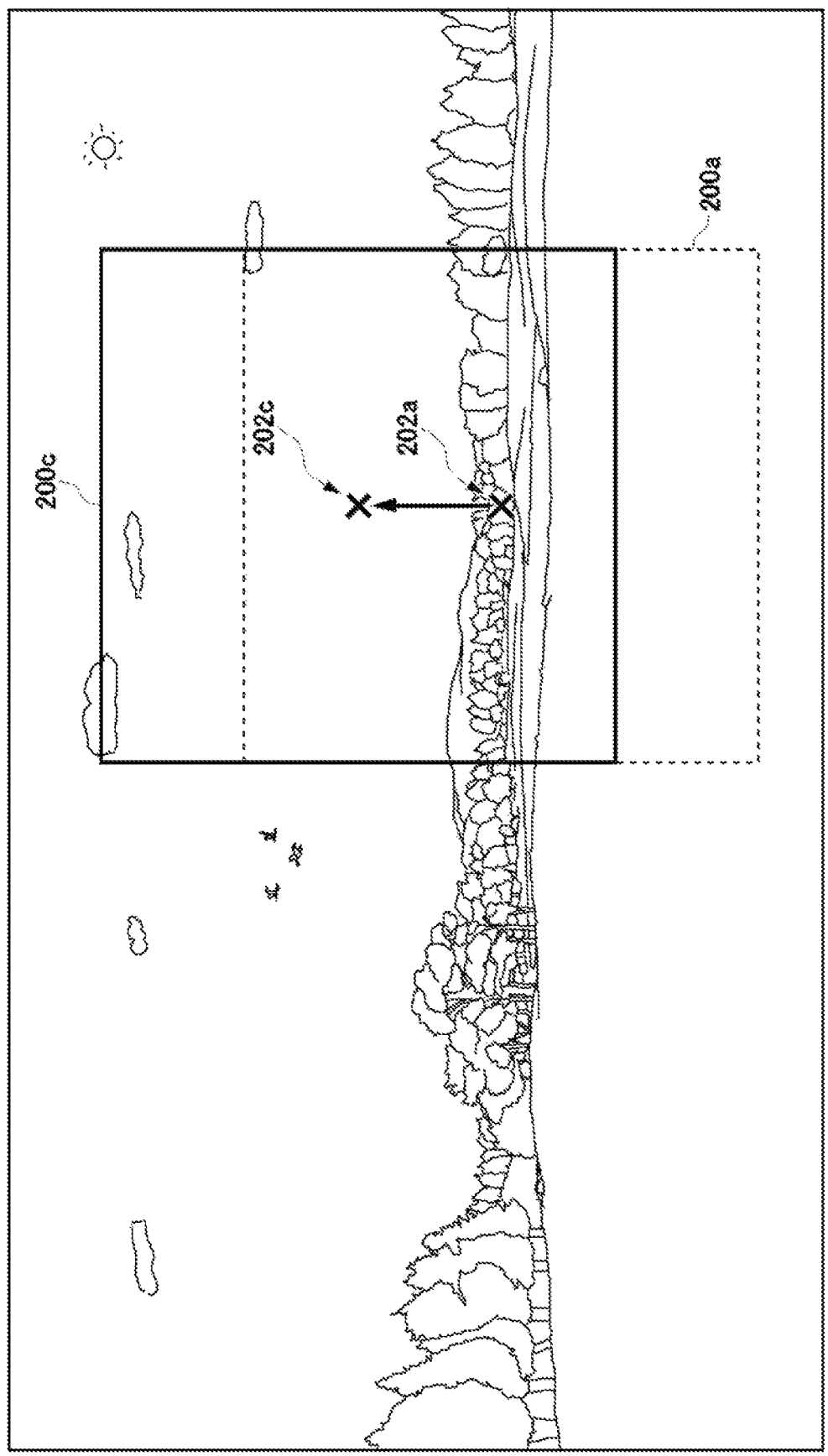
FIG. 9 is a schematic diagram illustrating another display image.

FIG. 9 illustrates a display image 200c generated by the image generating section 34. The visual line direction determining section 32 determines the visual line direction in accordance with the attitude of the HMD 100. The image generating section 34 generates the image based on the visual line direction thus determined. This example indicates that the user has tilted up his or her head from the state in which the display image 200a is displayed on the display panel 130, with the visual line changed continuously from the visual line direction 202a to a visual line direction 202c. Here, the user has tilted up his or her head approximately 30 degrees. The tilting motion causes the image generating section 34 to generate images at intervals of 1/60 second in a manner moving the panoramic image continuously upward starting from the display image 200a. The image providing section 36 provides the HMD 100 with the generated images at intervals of 1/60 second.

As described above, the user varies the visual line direction by moving his or her head. The information processing apparatus 10 provides the HMD 100 with a panoramic image given in a desired direction so that the HMD 100 will display the image on the display panel 130. The manner in which the visual line direction is varied by moving the head is the same as in the real world. What is virtually brought about thus accords with the user's sensation of the real world. Where the HMD 100 provides the user with a wide viewing angle, the user's sense of immersion in the panoramic image is further enhanced.

Meanwhile, if the user wants to view a panoramic image immediately behind his or her back, the user obviously has to turn back fully. Just turning the head is not enough for turning back fully; the user needs to change the orientation of the body. If the user is sitting on a non-rotating chair such as a sofa, the user is required to stand up to change the orientation of the body. If the HMD 100 is a non-transmissive display device, the user has both eyes covered with the enclosure 108 and is unable to see the surroundings. This might make the user slightly hesitate to move his or her legs to change the orientation of the body.

With this embodiment, the user is allowed to input through the input device 6 instructions to switch the visual line direction; the user can change the visual line direction by operating the input device 6 without moving his or her head. Whereas the embodiment presents the input device 6 as a device different from the HMD 100, the input device 6 may alternatively be integrated with the HMD 100. That is, the input device 6 may be provided as an operation input section attached to the wearing band 106 or the enclosure 108 of the HMD 100, for example.

Figure 10:
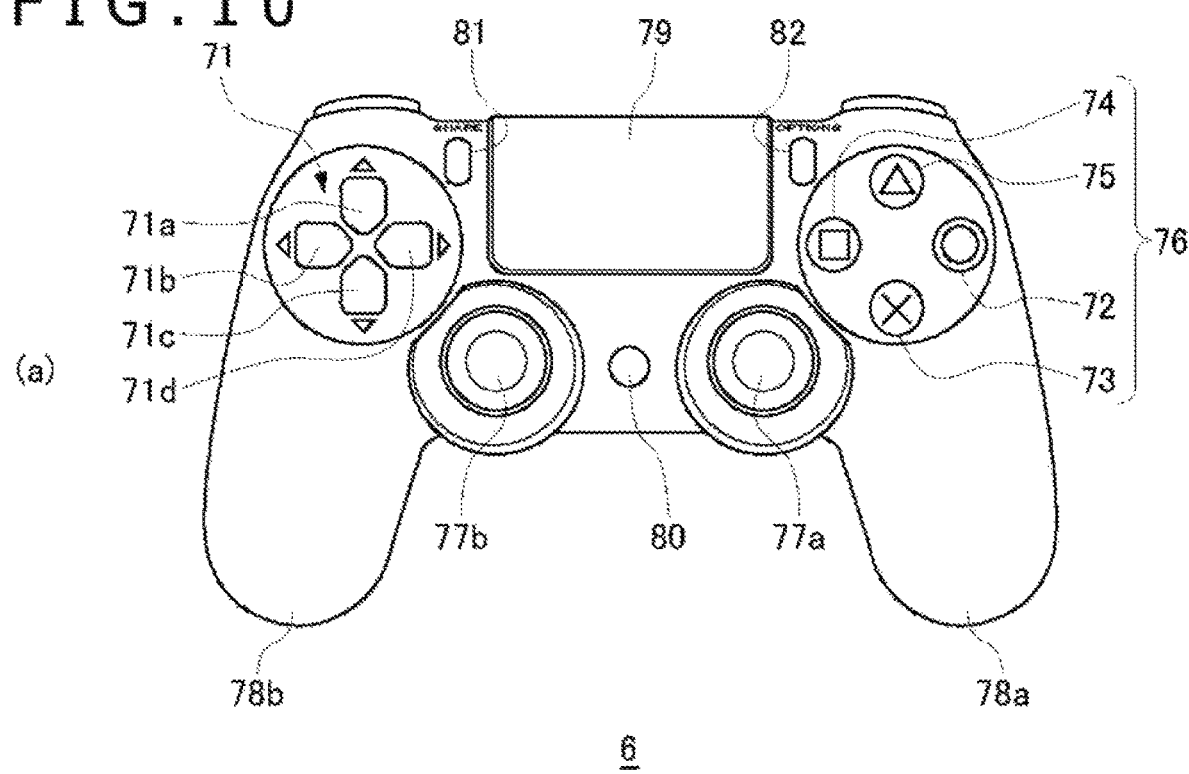
FIG. 10 is a set of schematic diagrams illustrating the top and the rear side of an input device.
Figure 10:
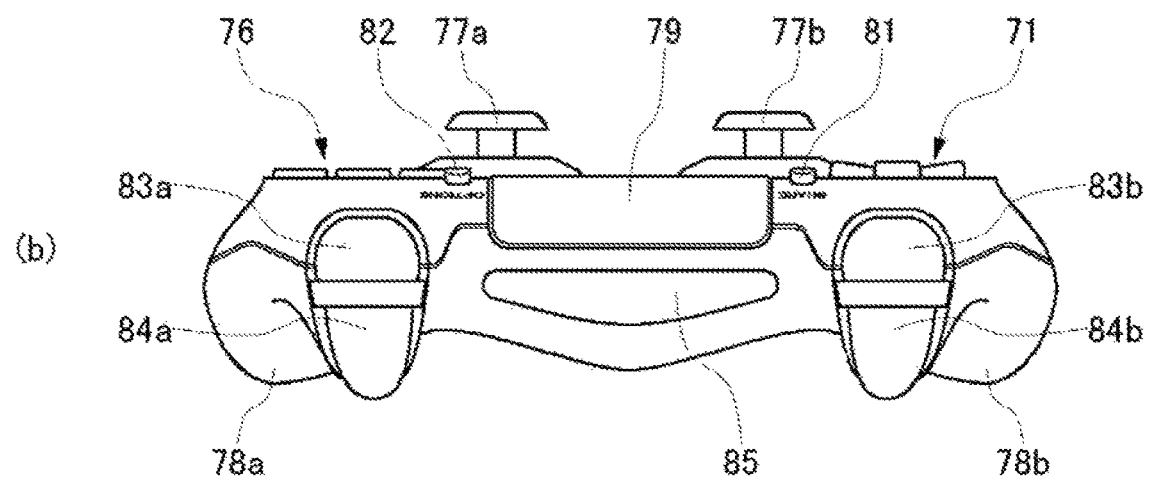

Subfigure (a) in FIG. 10 illustrates the top of the input device 6. The user operates the input device 6 by holding a left-side grip 78b with the left hand and a right-side grip 78a with the right hand. The enclosure top of the input device 6 is equipped with arrow buttons 71, analog sticks 77a and 77b, and operation buttons 76 making up the input section. The arrow buttons 71 include an upward button 71a, a leftward button 71b, a downward button 71c, and a rightward button 71d. The right analog stick 77a and the left analog stick 77b are tilted to input directions and tilting amounts. The right analog stick 77a and the left analog stick 77b also function as depressable buttons that are depressed when pushed by the user and return to the initial position when released. On the enclosure top, a touch pad 79 is arranged in a flat region between the arrow buttons 71 and the operation buttons 76. The touch pad 79 also functions as a depressable button that is depressed when pushed by the user and returns to the initial position when released.

A home button 80 is arranged between the right analog stick 77a and the left analog stick 77b. The home button 80 is used to turn on the power supply of the input device 6 and to activate a communication function for wirelessly communicating with the information processing apparatus 10 at the same time. A SHARE button 81 is arranged to the left of the touch pad 79. The SHARE button 81 is used to input the user's instructions to the operating system (OS) of the information processing apparatus 10 or to its software. An OPTIONS button 82 is arranged to the right of the touch pad 79. The OPTIONS button 82 is used to input the user's instructions to an application (game) executed by the information processing apparatus 10. The SHARE button 81 and the OPTIONS button 82 may each be formed as a push-button.

Subfigure (b) in FIG. 10 illustrates the rear side of the input device 6. At the upper part of the rear side of the enclosure of the input device 6 is a bent touch pad 79 extending from the top of the enclosure. At the lower part of the rear side of the enclosure is a horizontally elongated light-emitting section 85. The light-emitting section 85 has red (R), green (G), and blue (B) LEDs that are lit in accordance with luminescent color information sent from the information processing apparatus 10. An upper-right R1 button 83a and an upper-left L1 button 83b are each configured as a push-button. A lower-right R2 button 84a and a lower-left L2 button 84b are each configured as a pivotally-supported trigger type button.

Of the operating members of the input device 6 in this embodiment, the left analog stick 77b is used to input an instruction to switch the visual line direction. Tilting the left analog stick 77b left moves the visual line direction to the left, and tilting it right moves the visual line direction to the right. The left analog stick 77b is thus fit for the user to intuitively change the visual line direction. Other operating members such as the right analog stick 77a or the arrow buttons 71 may be used alternatively to input the instruction to switch the visual line direction.

The inventors experimented with various techniques of the process for changing the visual line direction by operation of the left analog stick 77b. One technique of the changing process involved continuously moving the visual line direction in accordance with the direction in which the left analog stick 77b is tilted to generate images in such a manner that the panoramic image would be moved in a flowing manner. This is a commonly-practiced method of changing the visual line direction in games displayed on the TV screen and is thought to well accord with the user's senses. Diverse experiments were also made with the speed at which the image was moved.

The experiments revealed that moving the panoramic image continuously by operation of the left analog stick 77b gives motion sickness to the user watching the image. Motion sickness was provoked regardless of the speed at which the image was moved. People experienced motion sickness, to a greater or lesser extent, regardless of whether the image was moved quickly or slowly.

On the TV screen, the display image is often moved continuously in one direction for dramatic impact. At such a time, the user usually does not experience motion sickness. Looking into this point, the inventors found that a difference in viewing angle is one of the causes of the unpleasant sensation.

The user views the TV screen from a certain distance. That means the viewing angle of the user in the horizontal direction of the TV screen is several dozen degrees at most. In contrast, the user's viewing angle on a wide-viewing-angle HMD is close to 90 degrees or equal to or greater than 90 degrees (the viewing angle in the horizontal direction of the HMD 100 is assumed to be approximately 100 degrees hereunder). That is, the HMD 100 tends to give motion sickness to the user because the image is continuously moved within the range of approximately 100 degrees (or over the entire field of view). This turned out to be a problem unique to the HMD 100. The inventors then experimented with moving the panoramic image not continuously but discontinuously by operation of the left analog stick 77b. The discontinuous movement of the image was found to prevent the onset of motion sickness. Given these findings, upon acquiring the operation of the left analog stick 77b as an instruction to switch the visual line direction, the information processing apparatus 10 of the embodiment performs display control in such a manner as to move the panoramic image at intermittent times (i.e., in steps), the image being moved at a predetermined angle per step.

When the user tilts the left analog stick 77b on the input device 6, the instruction acquiring section 24 acquires from the input device 6 the instruction to switch the visual line direction in the direction in which the stick is tilted. For example, if the left analog stick 77b is tilted once and allowed to return immediately to the initial position, the instruction acquiring section 24 acquires an instruction to switch the visual line direction in one step in the direction of the tilt. If the left analog stick 77b is tilted continuously, the instruction acquiring section 24 continuously acquires instructions to switch the visual line direction in the direction of the tilt.

Whether the instruction acquiring section 24 acquires the tilting operation of the left analog stick 77b as a one-time switching instruction or as a continuous switching instruction is determined depending on whether the tilting time (i.e., a time period during which the stick is tilted and is allowed to return to the initial position) exceeds a predetermined time period. Specifically, if the tilting time is less than the predetermined time period, the instruction acquiring section 24 acquires the tilting operation as a one-time switching instruction; if the tilting time reaches the predetermined time period, the instruction acquiring section 24 acquires at that time the tilting operation as another switching instruction. If the tilting operation is further continued, the switching instruction may be acquired every time a time period shorter than the predetermined time period elapses.

When the instruction acquiring section 24 acquires the instruction to switch the visual line direction, the visual line direction determining section 32 changes the visual line direction by a predetermined angle. For example, if the left analog stick 77b is tilted to the left, the instruction acquiring section 24 acquires a switching instruction to turn the visual line direction to the left. The visual line direction determining section 32 then changes the visual line direction to the left by the predetermined angle. Explained below is an example in which, with the display panel 130 of the HMD 100 displaying the display image 200a illustrated in FIG. 7, the user inputs to the input device 6 a switching instruction to turn the visual line direction to the left.

Figure 11:
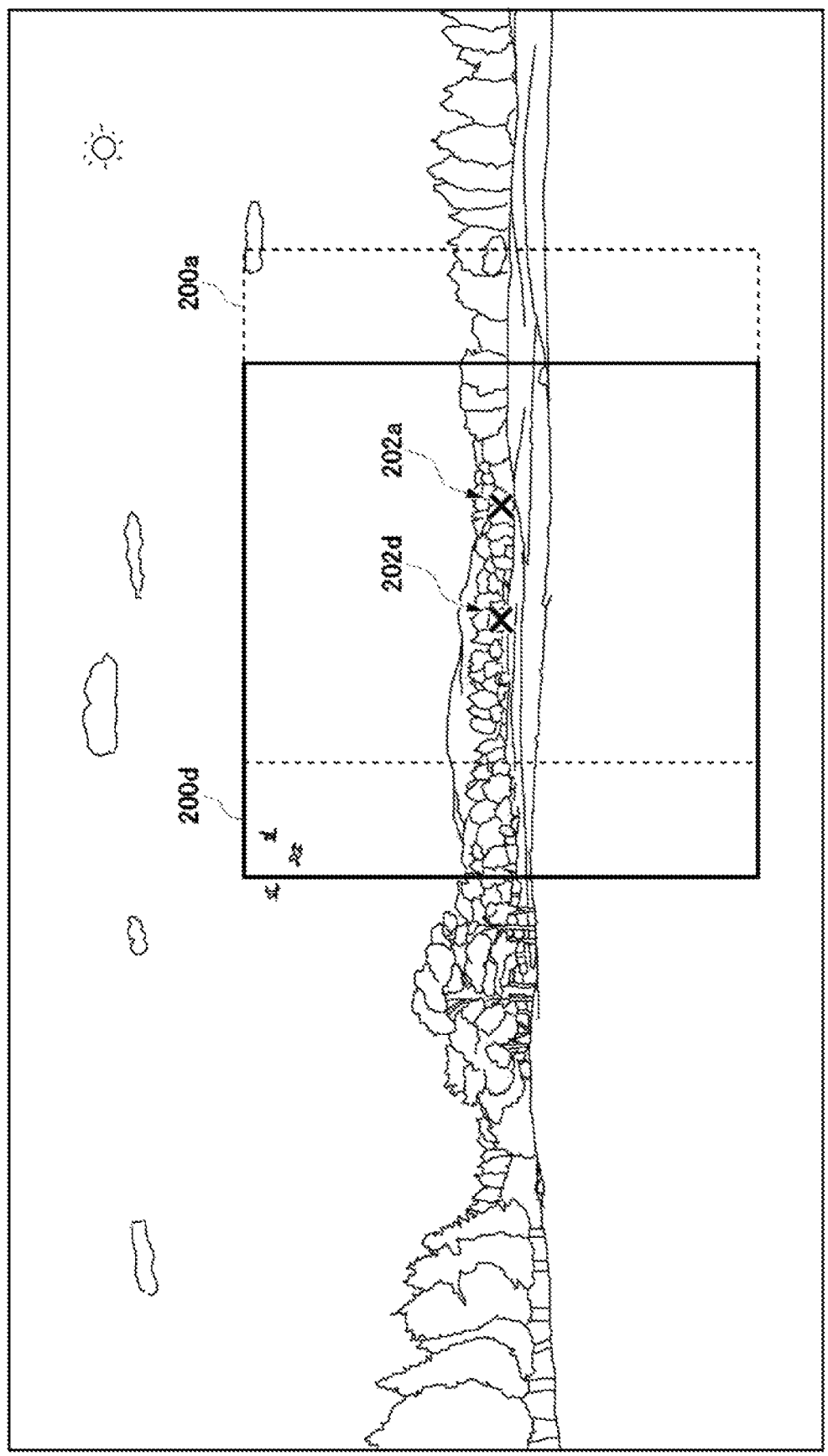
FIG. 11 is a schematic diagram illustrating another display image.

FIG. 11 illustrates a display image 200d generated by the image generating section 34. When the instruction acquiring section 24 acquires the switching instruction to turn the visual line direction to the left, the visual line direction determining section 32 turns the visual line direction to the left by the predetermined angle. The predetermined angle is assumed to be larger than 10 degrees and smaller than the viewing angle (100 degrees) of the HMD 100 in the horizontal direction.

If the angle to be changed in one step is set to be smaller than 10 degrees, at least 18 steps are needed by the user to view the image immediately behind his or her back (i.e., to make a 180-degree turn), for example. The numerous steps required might make the user a little impatient. On the other hand, if the angle to be changed in one step is larger than the viewing angle of the HMD 100, then a totally new image (an image not overlapping with the unswitched image) would suddenly appear on the display panel 130; the continuity with the unswitched image is not guaranteed. Preferably, the angle to be changed in one step is set to be larger than 10 degrees and smaller than the viewing angle of the HMD 100.

More preferably, the angle to be changed in one step may be set to be less than half the viewing angle of the HMD 100. This causes at least half of the unswitched image to be included in the newly switched image. The user is then able to recognize image continuity before and after the switch. To let the user better recognize image continuity, the angle to be changed in one step may preferably be smaller. After experimenting with diverse angles to be changed per step, the inventors concluded that an angle larger than 15 degrees and smaller than 30 degrees is most preferred as the angle to be changed per step in view of image continuity and the time to reach the desired angle through continuous switches. FIG. 11 illustrates an example in which the viewing angle is changed by 22.5 degrees in one step.

Generally, the central visual field of the humans is said to be 40 to 45 degrees and the peripheral visual field to be approximately 200 degrees. With the characteristic of the central visual field taken into consideration and with the changing angle per step set to be smaller than the central visual field, the same image may be arranged to partially remain in the central visual field before and after the switch. In view of this, it makes sense to set the angle to be changed in one step at 30 degrees or less. Preferably, the angle to be changed in one step is set to be a value obtained by dividing 360 degrees by an integer N so that the user can return to the initial display position by inputting through the input device 6 the integer number of switching instructions.

Figure 12:
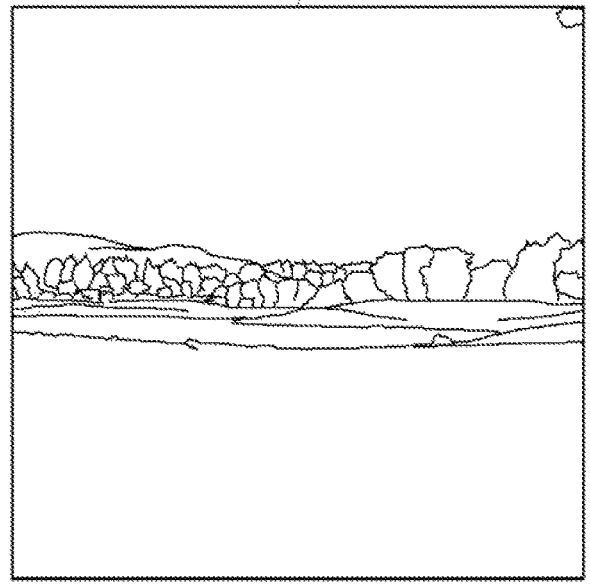
FIG. 12 is a set of schematic diagrams illustrating display images given before and after a switch.
Figure 12:
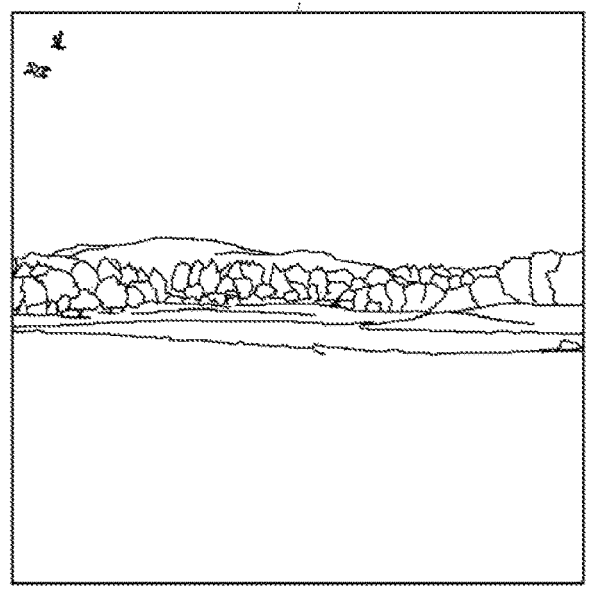

FIG. 12 illustrates display images displayed on the display panel 130 before and after a switch. Subfigure (a) in FIG. 12 illustrates the display image 200a, and Subfigure (b) in FIG. 12 indicates the display image 200d. The display image 200d is obtained by turning the display image 200a to the left by 22.5 degrees in one step. Given the viewing angle of 100 degrees, the angle to be changed in one step is set to be 22.5 degrees. Thus making one switch changes 22.5 percent of the image, which leaves 77.5 percent of the image being the same before and after the switch. This allows the user to easily recognize image continuity.

If the instruction acquiring section 24 acquires switching instructions continuously, the visual line direction determining section 32 changes the visual line direction at intervals of a predetermined angle. The changing interval may be a fixed value such as 1 second or defined dynamically depending on the tilting amount of the left analog stick 77b. That is, the larger the tilting amount, the shorter the changing interval may be set to be.

With this embodiment, the switching instructions given by the use of the input device 6 are effective only in the horizontal direction and not in the vertical direction. That is because people, when sitting or standing, usually look in the horizontal direction and not in the upward or downward direction continuously and because the actual senses of people are respected in VR applications. It is possible to let the switching instructions be effective in the vertical direction as well. Whether or not to enable switching instructions in the vertical direction may be determined depending on the content image. The switching instructions in the vertical direction may be enabled for content images such as captured images of a starry sky in a celestial sphere where the zenith and nadir positions need not be taken into account.

Whereas FIG. 12 illustrates the display images 200a and 200d displayed before and after a switch made with the angle of 22.5 degrees in one step, the user may wish to make the changing angle larger or smaller than 22.5 degrees. In such a case, the display panel 130 may be caused to display alternatives for selecting the angle to be changed per step. The user may then operate the input device 6 to select one of the alternatives displayed on the display panel 130. This embodiment provides the user with the alternatives of 15 degrees and 30 degrees in addition to the choice of 22.5 degrees.

Explained below is a procedure for causing the display panel 130 of the HMD 100 to display the alternatives for selecting the angle to be changed per step, with the display panel 130 displaying the display image 200a given in Subfigure (a) of FIG. 12.

The user may cause the display panel 130 to display menu items by operating a predetermined input section of the input device 6. For example, a menu display operation may be assigned to a triangle (Δ) button 75 (see Subfigure (a) in FIG. 10). When the user pushes the Δ button 75, the input device 6 transmits to the information processing apparatus 10 operation information indicating that the Δ button 75 is pushed. The instruction acquiring section 24 in the information processing apparatus 10 acquires the pushing information from the Δ button 75 as an instruction to display the menu items.

When the instruction acquiring section 24 acquires the instruction to display the menu items, the image generating section 34 performs a process of including the menu items into the panoramic image being generated. The menu items are an example the information elements to be presented to the user. Alternatively, the information elements may be other items or notification information. When the image generating section 34 includes the information elements such as the menu into the panoramic image, the user may view the displayed information elements on the display panel 130 of the HMD 100 while looking at the panoramic image in the visual line direction on the display panel 130.

The information element storing section 42 stores the information elements to be included in the panoramic image. The image generating section 34 reads from the information element storing section 42 the information elements corresponding to the display instruction, and superimposes a window listing the information elements onto the panoramic image. The image providing section 36 provides the HMD 100 with the panoramic image including the menu items.

Figure 13:
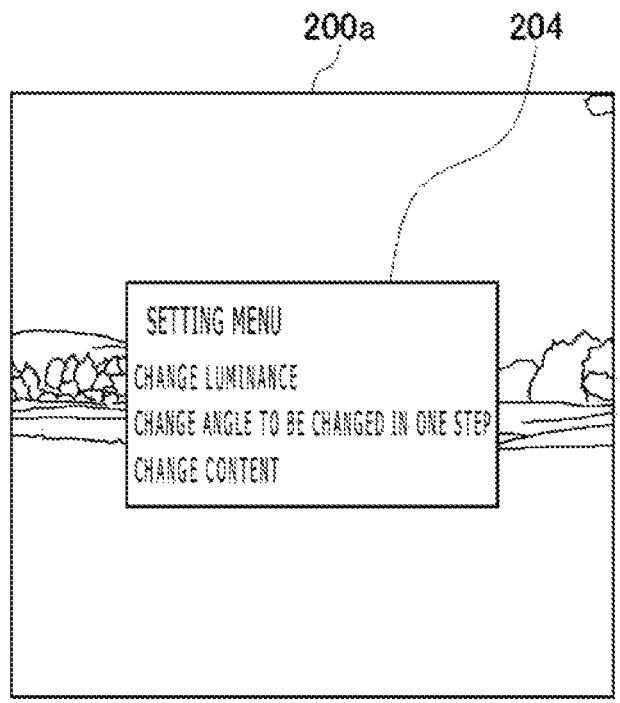
FIG. 13 is a set of schematic diagrams illustrating how information elements are typically superimposed on display images.
Figure 13:
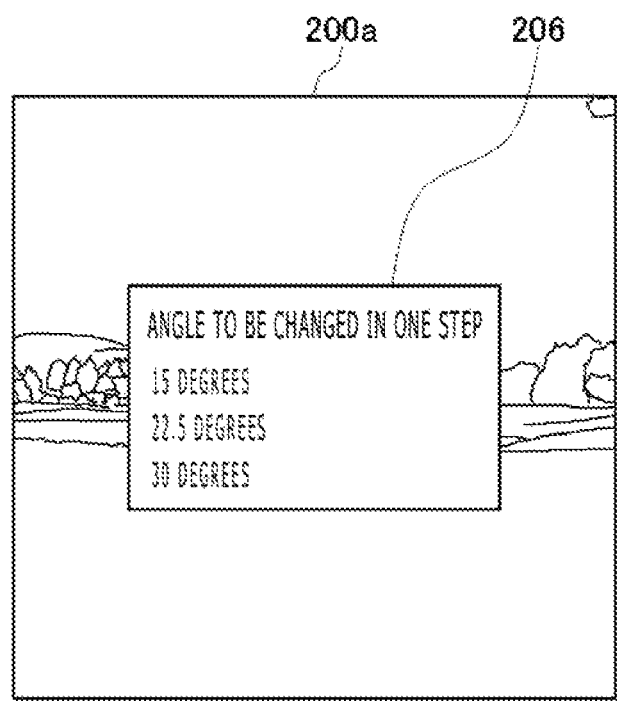

Subfigure (a) in FIG. 13 illustrates an example in which a menu window 204 is superimposed on the display image 200a. In Subfigure (a) of FIG. 13, the panoramic image behind the menu window 204 is hidden thereby. Preferably, the menu window 204 in practice may be displayed transparently so that the panoramic image behind the menu window 204 can be seen through.

In the menu window 204, a selection rectangle enclosing one item is displayed. The user may move the selection rectangle by pushing the upward button 71a or the downward button 71c on the input device 6. When the selection rectangle is positioned to the desired item and an enter button (e.g., a circle (○) button 72) is pushed, the display panel 130 displays the information elements subordinate to the selected item.

In the information processing apparatus 10, the instruction acquiring section 24 acquires the operation information from the arrow buttons 71 as instructions to select the item and the operation information from the ○ button 72 as the instruction to enter the item. The image generating section 34 moves the selection rectangle in accordance with the instructions to select the item, reads from the information element storing section 42 the corresponding information elements in accordance with the instruction to enter the item, and includes the retrieved information elements into the panoramic image.

Subfigure (b) in FIG. 13 illustrates an example in which a selection window 206 is superimposed on the display image 200*a*. If the item "Change the angle to be changed in one step" is selected in the menu window 204 of Subfigure (a) in FIG. 13, the selection window 206 is displayed to present alternatives for selecting the angle to be changed per step. Preferably, as with the menu window 204, the selection window 206 may be displayed transparently to let the user view the panoramic image behind the window. When the user selects one of the angle-selecting alternatives and enters the selection on the selection window 206, the new angle to be changed in one step is selected.

The information elements are superimposed on the panoramic image in the manner described above and displayed on the display panel 130. In the information processing system 1, the panoramic image on the display panel 130 is changed in accordance with the changing attitude of the HMD 100 (i.e., movement of the visual line direction) and with operations on the left analog stick 77*b*. The inventors examined how the HMD 100 would control the manner in which the information elements are displayed along with the panoramic image.

The inventors first experimented with a technique for always displaying the information elements at the center of the screen on the display panel 130. In this case, the position where the information elements are displayed on the screen remains unchanged regardless of the panoramic image behind the information elements being changed in keeping with the changing visual line direction. The information elements are always displayed in a fixed position at the center of the screen. This displaying technique turned out to give the impression as if the information elements were moving within the panoramic image, thereby provoking a feeling of discomfort.

The inventors then experimented with a technique by which the information elements, once included into the panoramic image, are kept fixed where they are arranged. That is, the position where the information elements are arranged in the panoramic image is fixed. When the user changes his or her visual line direction, the information elements are moved integrally with the panoramic image. This technique turned out not to provoke a feeling of discomfort in the user because the relative positional relation between the information elements and the panoramic image is fixed so that the information elements appear to be part of the panoramic image.

In this case, however, a large movement of the visual line direction can cause the information elements to disappear from the display screen because they move along with the panoramic image. The user then loses sight of the information elements. In particular, because the input device 6 is assigned to the menu operations while the menu is being displayed, the user is required to change his or her visual line direction to find the menu window that has disappeared, regardless of whether the menu operations are to be continued or terminated.

To solve that problem, the inventors came up with a technique for basically fixing the relative positional relation between information elements and the panoramic image so that the information elements will move together with the panoramic image. When the information elements are about to disappear from the screen, this technique causes the relative positional relation between the information elements and the panoramic image to be changed.

According to this technique, the point at which information elements are initially displayed is determined as a reference point. The attitude of the HMD 100 is then changed from the reference point. If the amount of change in the attitude is smaller than a predetermined first angle, the image generating section 34 displays the information elements in a manner that they move along with the image. If the amount of change in the attitude reaches the predetermined first angle, the image is generated in such a manner that the information elements are displayed in a position moved by a predetermined second angle within the image. The amount of change in the attitude of the HMD 100 corresponds to the amount of change in the movement of the visual line direction.

Specifically, the visual line direction determining section 32 monitors changes in the movement of the visual line direction starting from the point at which the information elements are initially displayed. If the movement of the visual line direction is smaller than the predetermined first angle, the image generating section 34 displays the information elements in a manner that they move along with the panoramic image. If the movement of the visual line direction reaches the predetermined first angle, the image generating section 34 displays the information elements in a position moved by the predetermined second angle within the panoramic image. Explained below is an example in which the visual line direction determining section 32 monitors the rotation angle of the visual line in the horizontal direction, with the image generating section 34 performing display control of the information elements accordingly.

For example, suppose that starting from the point at which the display of information elements is started, the user turns his or her head to the left in the horizontal direction so that the user's visual line direction is changed to the left. In this case, the panoramic image is displayed as if it were flowing to the right. Thus the displayed information elements also appear to be flowing rightward on the display panel 130. When the traveling angle of the information elements, i.e., the rotation angle of the visual line in the horizontal direction, reaches the predetermined first angle, the image generating section 34 displays the information elements after moving them to a position reached by a left turn at the predetermined second angle within the panoramic image. The first angle is set to be such that the information elements will not disappear completely from the user's visual field when moved. The information elements are thus kept displayed at least partially on the display panel 130. In the description that follows, the first angle may be referred to as "position change reference angle" and the second angle as "return angle" where appropriate.

Figure 14:
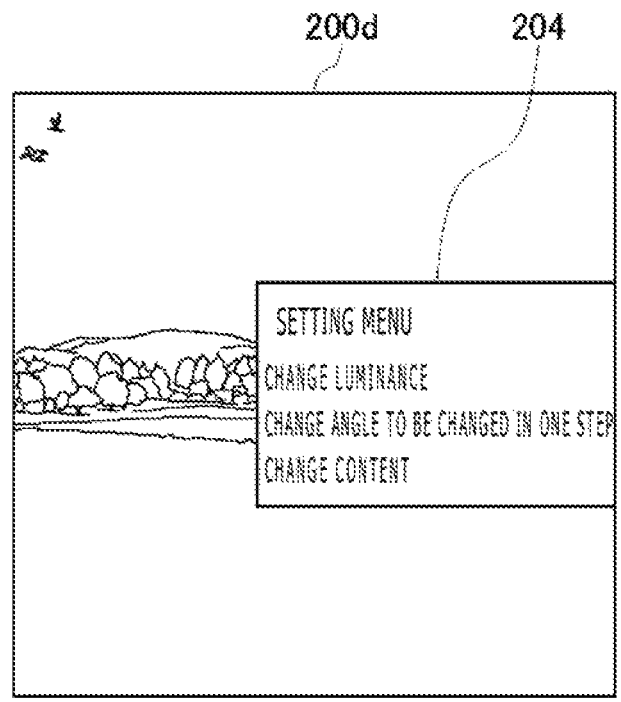
FIG. 14 is a set of schematic diagrams illustrating how information elements are moved along with panoramic images.
Figure 14:
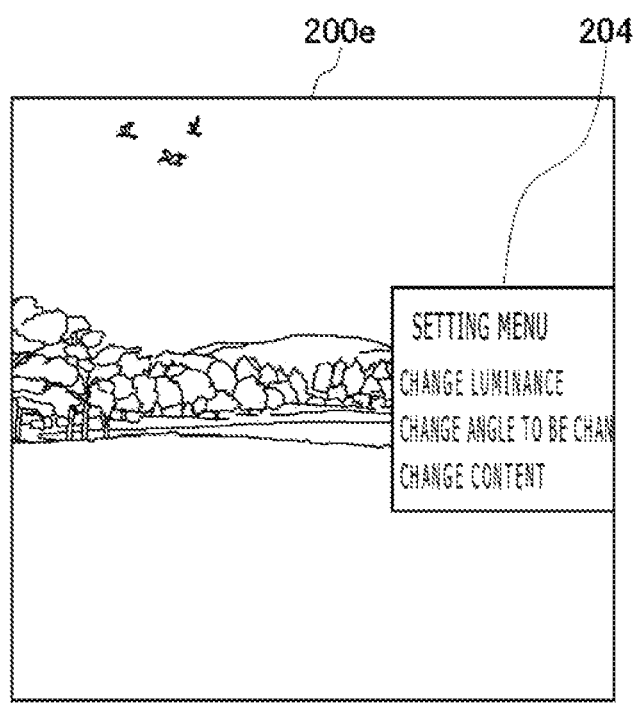

Explained below is an example in which the user turns his or her visual line direction to the left from an initial display state where the menu window 204 is initially displayed as illustrated in Subfigure (a) of FIG. 13. FIG. 14 illustrates how the menu window 204 listing the information elements is moved along with the panoramic image. When the user turns his or her head to the left in the horizontal direction, the motion detecting section 30 detects the attitude of the HMD 100. The visual line direction determining section 32 turns the visual line direction to the left in accordance with the detected attitude of the HMD 100. Subfigure (a) in FIG. 14 illustrates the display image 200d as it is turned to the left by 22.5 degrees from the initial display state. As discussed above, the 22.5-degree turn is made alternatively by operation of the left analog stick 77b. Without moving the head, the user may tilt the left analog stick 77 to the left to have the display image 200d displayed on the display panel 130.

Because the relative positional relation between the menu window 204 and the panoramic image is fixed, the menu window 204 is moved along with the panoramic image. On the display panel 130, the user thus watches the menu window 204 moving to the right.

Subfigure (b) in FIG. 14 illustrates a display image 200e as it is turned 45 degrees to the left from the initial display state. In order to display the display image 200e, the user may turn his or her head 45 degrees to the left. Alternatively, the 45-degree left turn may be accomplished using the left analog stick 77b being tilted twice to the left or by the user turning the head 22.5 degrees to the left followed by the left analog stick 77b being tilted once to the left. Compared with Subfigure (a) in FIG. 14, the menu window 204 appears to be moved further to the right.

Figure 15:
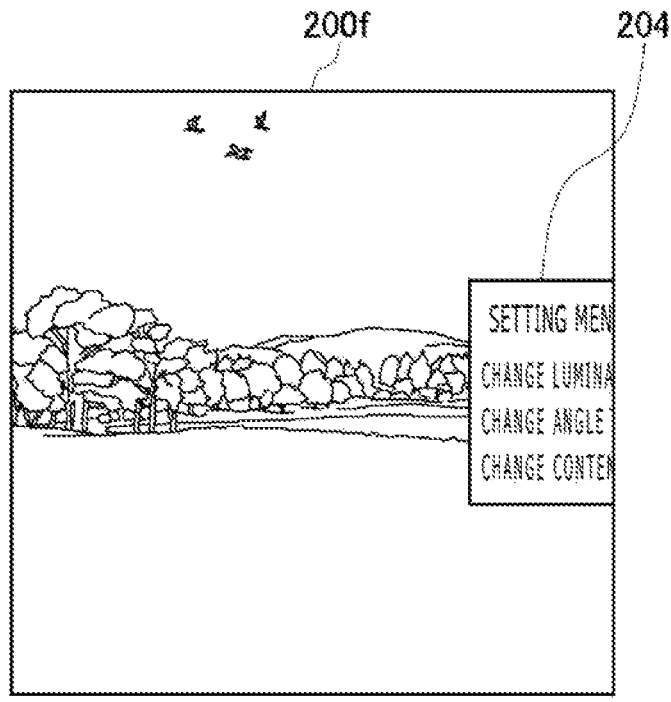
FIG. 15 is a set of schematic diagrams illustrating how information elements are superimposed on panoramic images.
Figure 15:
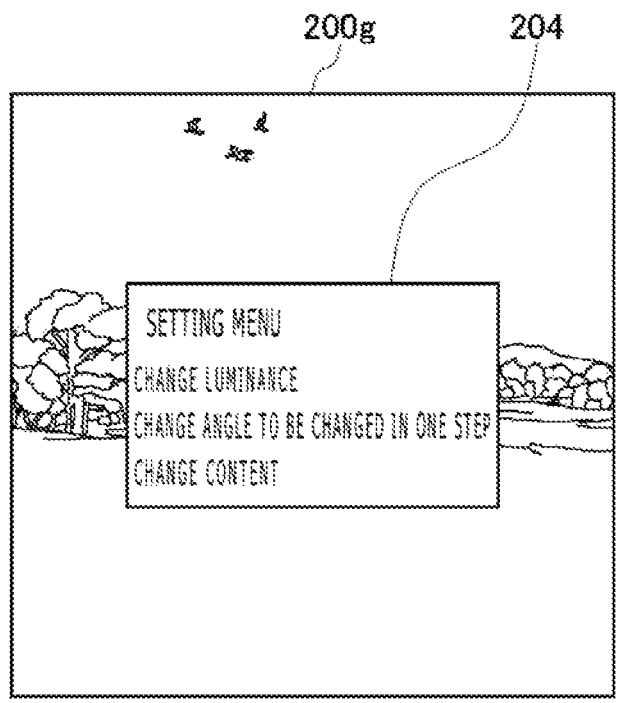

Subfigure (a) in FIG. 15 illustrates a display image 200f as it is turned to the left from the initial display state until the position change reference angle is just about to be reached. The position change reference angle is set here to be such that the information elements do not entirely disappear from the screen.

This requires that the position change reference angle be set to be smaller than the viewing angle of the HMD 100. If the position change reference angle is equal to or larger than the viewing angle, the information elements could entirely disappear from the screen. The position change reference angle in the horizontal direction should thus be set to be smaller than 100 degrees because the viewing angle of the HMD 100 in the horizontal direction is 100 degrees.

Experiments with various settings of the position change reference angle led the inventors to conclude that a position change reference angle set to be extremely small compared with the viewing angle of the HMD 100 gives the impression of the display elements more or less tracking the visual line. After the experiments, the position change reference angle was set to be approximately half the viewing angle of the HMD 100. This angle setting was found to allow both display elements and the panoramic image in the background to be integrally recognized and to provide a user interface enabling the display elements to be visible. In the embodiment, the position change reference angle (first angle) is set to be 60 degrees, which is close to half (50 degrees) the viewing angle of the HMD 100.

Subfigure (b) in FIG. 15 illustrates a display image 200g with the information elements turned to the left from the initial display state within the panoramic image by the second angle (60 degrees), which is the return angle. When the amount of change in the visual line in this direction reaches the first angle (60 degrees) starting from the initial display state, the image generating section 34 rearranges the relative positional relation between the information elements and the panoramic image to a position moved by the second angle in the current direction. At this point, the second angle is set to be the same as the first angle. After the rearrangement, the visual line direction determining section 32 monitors changes in the movement of the visual line direction in reference to the visual line direction determined at the point of the rearrangement.

Whereas Subfigure (a) in FIG. 15 illustrates only part of the menu window 204, Subfigure (b) in FIG. 15 illustrates the entire menu window 204 being displayed again in its entirety. This facilitates menu operation of the menu window 204 by the user. And as illustrated in Subfigure (a) of FIG. 15, display control is performed in such a manner that the menu window 204 will not disappear completely from the screen. This allows the user to operate when desired the menu window 204 without losing sight of it while enjoying the panoramic image.

The foregoing paragraphs explained the example in which the first angle as the position change reference angle is the same as the second angle as the return angle. If the first angle and the second angle are identical and if the visual line direction is changed by the first angle from the initial display state, the information elements are rearranged to the center position at which the information elements were displayed in the initial display state as illustrated in Subfigure (b) of FIG. 15. Thus if the user turns his or her head further to the left in the horizontal direction, the menu window 204 moves from the center to the right. That means the menu window 204 is displayed somewhat to the right, which is slightly uncomfortable to look at.

Explained below is an example in which the first angle as the position change reference angle is set to be larger than the second angle as the return angle. The second angle is set to be 60 degrees, and the first angle is set to be 45 degrees.

Suppose now that Subfigure (b) in FIG. 14 illustrates the display image 200e as it is turned to the left from the initial display state until the first angle (45 degrees) is just about to be reached. If the visual line in this direction is further moved so that the amount of its change reaches the first angle (45 degrees), the image generating section 34 rearranges the relation positional relation between the information elements and the panoramic image to a position moved by the second angle (60 degrees) in the current direction. Because the second angle is set to be larger than the first angle, the rearranged information elements are returned past the center position of the initial display state and thus displayed to the left of the center position. Following the rearrangement, the visual line direction determining section 32 monitors changes in the movement of the visual line direction in reference to the visual line direction determined at the point of the rearrangement.

Figure 16:
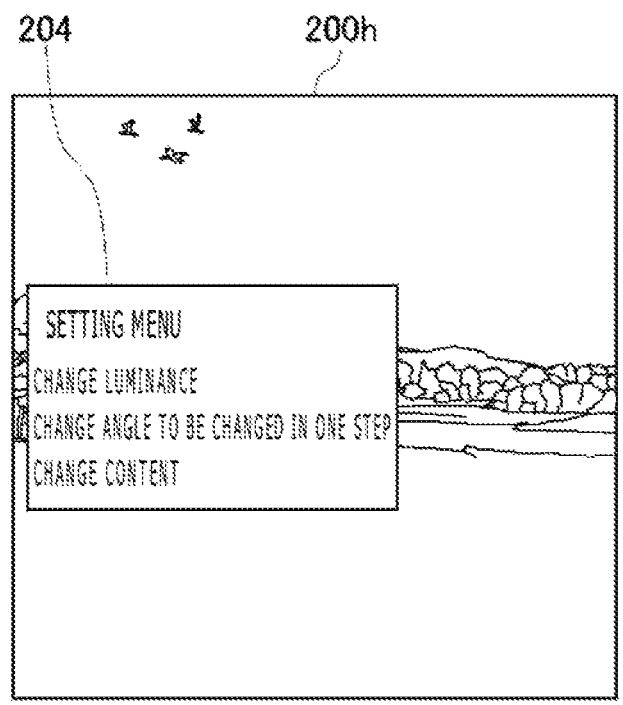
FIG. 16 is a schematic diagram illustrating how information elements are superimposed on a panoramic image.

FIG. 16 illustrates a display image 200h with the information elements turned to the left at the second angle (60 degrees) within the panoramic image. When the amount of change in the visual line in this direction reaches the first angle (45 degrees) from the initial display state, the image generating section 34 rearranges the information elements to a position returned in the current direction by the second angle (60 degrees) within the panoramic image.

With the second angle set to be larger than the first angle, if the user keeps moving his or her visual line direction further to the left, the menu window 204 gradually moves to the right toward the center. This makes it possible to enhance the visibility of the information elements while allowing the user to recognize the integrity of the display elements and the panoramic image in the background. If the first angle is set to be larger than half the second angle, the amount of movement of the display elements in the panoramic image is prevented from increasing when the display elements are rearranged.

It was explained above that when the change of the visual line in the horizontal direction reaches the position change reference angle (first angle), the arrangement of the information elements in the horizontal direction is changed by the return angle (second angle). The same applies to the vertical direction. When the change of the visual line in the vertical direction reaches a position change reference angle in that direction, display control may be performed in such a manner that the arrangement of the information elements in the vertical direction is changed by a return angle in that direction. The position change reference angle in the vertical direction may be set to be smaller than the position change reference angle in the horizontal direction. For example, the position change reference angle in the vertical direction may be set to be 30 degrees.

Examined next is where information elements are to be initially displayed. One technique involves positioning the information elements near the center of the currently displayed image whenever the elements are displayed as illustrated in Subfigure (a) of FIG. 13. This technique is effective because it is easy to understand intuitively for the user.

Another technique may involve setting beforehand candidate display positions for the information elements in the virtual sphere. In the coordinate system of the virtual sphere, the horizontal reference direction on the horizontal plane is assumed to be zero degree. On that assumption, candidate rotation angles are set to be 60 degrees, 120 degrees, 180 degrees, 240 degrees, and 300 degrees in the horizontal direction; and candidate inclination angles are set to be 0 degree, ±30 degrees, and ±60 degrees in the vertical direction. When the information elements are displayed, the candidate rotation angle and the candidate inclination angle closest to the visual line direction may be extracted, and the information elements may be displayed in a manner centering on the extracted rotation angle and inclination angle. Where the initial position candidates are determined in advance, the image generating section 34 need only select the appropriate initial position from among the candidate positions. This technique simplifies display control.

While the present invention has been described in conjunction with a specific embodiment given as an example, it should be understood by those skilled in the art that the above-described composing elements and various processes may be combined in diverse ways and that such combinations, variations and modifications also fall within the scope of this invention.

It was explained above with reference to Subfigure (a) of FIG. 14 that the display image 200d and menu window 204 are displayed turned 22.5 degrees to the left from the initial display state and that the 22.5-degree left turn may be achieved either by the user turning his or her head or by the left analog stick 77b being operated. In a variation, the left analog stick 77b may be operated to cancel the relative positional relation between the information elements and the panoramic image. In this case, the information elements may be displayed at the center as illustrated in Subfigure (b) of FIG. 13 in the image following the witch by operation of the left analog stick 77b. This is made possible because image continuity is broken by a jump of the display image when it is switched by operation of the left analog stick 77b. In such a case, display control of the information elements is available following the unlocking of the relative positional relation between the information elements and the panoramic image.

It was also explained in connection with the embodiment that display control of the information elements is performed using the position change reference angle and the return angle. In a variation, display control of the information elements may be carried out in accordance with the information element type. For example, if the system issues an important warning to the user, the image generating section 34 may always arrange the warning at the center of the display image as the information element.

The image generating section 34 may implement a mirror function as a VR application function. The mirror function in this context is the function of including an image opposite to the visual line direction into the display image. What is included into the display image is not an image that is the exact opposite to the visual line direction but an image obtained by reversing only the rotation angle of the visual line direction, i.e., by turning the rotation angle of the visual line direction 180 degrees while leaving the inclination angle intact. This mirror function allows the user to view the image behind his or her back at the same height.

REFERENCE SIGNS LIST

1 Information processing system
6 Input device
8 Virtual camera
10 Information processing apparatus
12 Processing device
14 Output control device
20 Sensor information acquiring section
22 Captured image acquiring section
24 Instruction acquiring section
30 Motion detecting section
32 Visual line direction determining section
34 Image generating section
36 Image providing section
40 Image storing section
42 Information element storing section
100 Head-mounted display device (HMD)
102 Output mechanism section
104 Wearing mechanism section
106 Wearing band
108 Enclosure
110 Light-emitting marker
120 Control section
122 Storage section
124 Attitude sensor
126 Microphone
128 Communication control section
130 Display panel
132 Audio output section

INDUSTRIAL APPLICABILITY

The present invention may be implemented in technical fields where the head-mounted display device is used.

The invention claimed is:
1. An information processing apparatus comprising:
a detecting section configured to detect the attitude of a head-mounted display device worn on the head of a user;
an image generating section configured to generate an image in accordance with the attitude of the head-mounted display device detected by the detecting section; and
an image providing section configured to provide the head-mounted display device with the generated image,
wherein the image generating section includes an information element superimposed on the generated image, and when the attitude of the head-mounted display device is changed by less than a first angle during display of the image including the information element on the head-mounted display device, the image generating section displays the information element in such a manner that the information element moves along with the image, and if the attitude of the head-mounted display device reaches the first angle, the information element is moved to a position by a second angle in an opposite direction to a rotation direction of the head-mounted display device.

2. The information processing apparatus according to claim 1, further comprising:

a visual line direction determining section configured to determine a visual line direction in accordance with the attitude of the head-mounted display device detected by the detecting section, wherein the image generating section generates an image based on the determined visual line direction, and the image generating section displays the information element in such a manner that the information element moves along with the image if the movement of a visual line in a predetermined direction is smaller than the first angle, the image generating section further displaying the information element in a position moved by the second angle in the predetermined direction in the image if the movement of the visual line in the predetermined direction reaches the first angle.

3. The information processing apparatus according to claim 2, wherein the image generating section performs display control of the information element in accordance with a rotation angle of a visual line in a horizontal direction.

4. The information processing apparatus according to claim 1, wherein the first angle is smaller than a viewing angle of the head-mounted display device.

5. The information processing apparatus according to claim 1, wherein the second angle is larger than the first angle.

6. An image generating method comprising:

detecting the attitude of a head-mounted display device worn on the head of a user; and generating an image in accordance with the detected attitude of the head-mounted display device, wherein the image generating includes an information element superimposed on the generated image, and when the attitude of the head-mounted display device is changed by less than a first angle during display of the image including the information element on the head-mounted display device, the image generating displays the information element in such a manner that the information element moves along with the image, and if the attitude of the head-mounted display device reaches the first angle, the information element is moved to a position by a second angle in an opposite direction to a rotation direction of the head-mounted display device.

7. A non-transitory computer readable medium having stored thereon a program for a computer, the program comprising:

detecting, by a detecting section, the attitude of a head-mounted display device worn on the head of a user; and generating, by an image generating section, an image in accordance with the detected attitude of the head-mounted display device, wherein the image generating includes an information element superimposed on the generated image, and when the attitude of the head-mounted display device is changed by less than a first angle during display of the image including the information element on the head-mounted display device, the image generating section displays the information element in such a manner that the information element moves along with the image, and if the attitude of the head-mounted display device reaches the first angle, the information element is moved to a position by a second angle in an opposite direction to a rotation direction of the head-mounted display device.

* * * * *